(12) United States Patent
Lee

(10) Patent No.: US 10,949,022 B2
(45) Date of Patent: Mar. 16, 2021

(54) METHOD, DEVICE, AND SYSTEM FOR DETERMINING A FALSE TOUCH ON A TOUCH SCREEN OF AN ELECTRONIC DEVICE USING AN AI MODEL

(71) Applicant: LG Electronics Inc., Seoul (KR)

(72) Inventor: Jae Ho Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/571,745

(22) Filed: Sep. 16, 2019

(65) Prior Publication Data
US 2020/0012382 A1 Jan. 9, 2020

(30) Foreign Application Priority Data

Aug. 19, 2019 (KR) .................. 10-2019-0101019

(51) Int. Cl.
| | | |
|---|---|---|
| *G06F 3/041* | (2006.01) | |
| *G06N 3/00* | (2006.01) | |
| *G06N 20/00* | (2019.01) | |
| *G06N 3/08* | (2006.01) | |
| *G06N 7/00* | (2006.01) | |
| *G06N 5/00* | (2006.01) | |

(52) U.S. Cl.
CPC ............ *G06F 3/0418* (2013.01); *G06N 3/00* (2013.01); *G06N 3/006* (2013.01); *G06N 3/08* (2013.01); *G06N 5/003* (2013.01); *G06N 7/005* (2013.01); *G06N 20/00* (2019.01)

(58) Field of Classification Search
CPC .............. G06F 3/0418; G06F 3/04182; G06F 3/04186; G06F 3/044; G06F 3/0412; G06N 3/00; G06N 3/08; G06N 3/006; G06N 7/005; G06N 20/00; G06N 5/003
See application file for complete search history.

(56) References Cited

U.S. PATENT DOCUMENTS

| | | | |
|---|---|---|---|
| 2016/0012348 A1* | 1/2016 | Johnson ............. | G06F 3/04186 706/12 |
| 2016/0259448 A1* | 9/2016 | Guarneri ............. | G06F 3/03545 |
| 2016/0306491 A1* | 10/2016 | Lee .................... | G06K 9/00006 |
| 2017/0371486 A1* | 12/2017 | Neiswander ......... | G06F 3/0418 |
| 2018/0188938 A1* | 7/2018 | Deselaers ............. | G06N 3/084 |
| 2018/0191517 A1* | 7/2018 | Emigh .................... | G06F 3/017 |

(Continued)

FOREIGN PATENT DOCUMENTS

| | | |
|---|---|---|
| KR | 1020160036927 | 4/2016 |
| KR | 1020180116812 | 10/2018 |

*Primary Examiner* — Darlene M Ritchie
(74) *Attorney, Agent, or Firm* — Fish & Richardson P.C.

(57) ABSTRACT

The touch screen system includes a touch input detector for detecting a touch input in order to obtain a touch result value through the touch screen, and detecting at least two of a time interval of the detected touch input, a touch area of the touch input, a touch intensity of the touch input, or a temperature of the touch input, a touch type classifier for outputting whether the detected touch input is a normal touch or a false touch from a learned AI model, and a communicator for communicating with the server, the communicator transmitting to the server, and the server includes an AI model learner for generating the learned AI model. According to the present disclosure, it is possible to determine the touch error by using the AI, the AI based false touch recognition technology, and the 5G network.

20 Claims, 14 Drawing Sheets

(56) References Cited

U.S. PATENT DOCUMENTS

| | | | |
|---|---|---|---|
| 2019/0321643 A1* | 10/2019 | Sohn | A61N 1/37211 |
| 2020/0027033 A1* | 1/2020 | Garg | G06N 20/00 |
| 2020/0064960 A1* | 2/2020 | Munemoto | G06F 3/0488 |
| 2020/0104037 A1* | 4/2020 | Bar-on | G06F 3/04883 |

* cited by examiner

| # | Interval Ti Area (cm^) | Temperature | Type |
|---|---|---|---|
| 2 | 552 | 0.95 | 28.4 | Normal |
| 3 | 563.2 | 2.99 | 27 | Normal |
| 4 | 592.8 | 3.47 | 31 | Normal |
| 5 | 252.8 | 1.37 | 24.8 | Normal |
| 6 | 371.2 | 3.02 | 34.2 | Normal |
| 7 | 275.2 | 2.45 | 32.6 | Normal |
| 8 | 267.2 | 3.05 | 24.2 | Normal |
| 9 | 504.8 | 3.62 | 26 | Normal |
| 10 | 515.2 | 1.1 | 34.6 | Normal |
| 11 | 326.4 | 1.76 | 20.4 | Normal |
| 12 | 525.6 | 3.56 | 34.6 | Normal |
| 13 | 348.8 | 1.46 | 21.8 | Normal |
| 14 | 605.6 | 3.05 | 22.2 | Normal |
| 15 | 336.8 | 1.85 | 20.8 | Normal |
| 16 | 706.4 | 3.26 | 33.2 | Normal |
| 17 | 601.6 | 1.9 | 31.4 | Obscure |
| 18 | 665.6 | 1.21 | 34.6 | Obscure |
| 19 | 420.8 | 1.9 | 18.6 | Obscure |
| 20 | 633.6 | 1.42 | 32.8 | Obscure |
| 21 | 427.2 | 0.46 | 29.4 | Obscure |
| 22 | 367.2 | 1.63 | 33.6 | Obscure |
| 23 | 535.2 | 1.75 | 31 | Obscure |
| 24 | 647.2 | 1.48 | 24.2 | Obscure |
| 25 | 408.8 | 1.57 | 34 | Obscure |
| 26 | 295.2 | 0.88 | 17.2 | Obscure |
| 27 | 641.6 | 1.09 | 22.2 | Obscure |
| 28 | 258.4 | 1.87 | 19.8 | Obscure |
| 29 | 560.8 | 0.82 | 25 | Obscure |
| 30 | 684.8 | 0.88 | 29.8 | Obscure |
| 31 | 337.6 | 1.24 | 32.8 | Obscure |
| 32 | 464 | 2.21 | 28.5 | Ghost |
| 33 | 77.6 | 9.77 | 57.5 | Ghost |
| 34 | 60.8 | 2.63 | 54.5 | Ghost |
| 35 | 28.8 | 3.89 | 59 | Ghost |
| 36 | 60.8 | 5.15 | 45.5 | Ghost |
| 37 | 157.6 | 7.94 | 30 | Ghost |
| 38 | 119.2 | 7.49 | 35 | Ghost |
| 39 | 42.4 | 4.55 | 32.5 | Ghost |
| 40 | 130.4 | 8.87 | 29 | Ghost |
| 41 | 157.5 | 8.15 | 55 | Ghost |
| 42 | 185 | 5.57 | 60.5 | Ghost |
| 43 | 147.5 | 3.86 | 37.5 | Ghost |
| 44 | 142.5 | 3.89 | 56 | Ghost |
| 45 | 187.5 | 2.93 | 22 | Ghost |
| 46 | 202.5 | 6.29 | 46 | Ghost |

METHOD, DEVICE, AND SYSTEM FOR DETERMINING A FALSE TOUCH ON A TOUCH SCREEN OF AN ELECTRONIC DEVICE USING AN AI MODEL

CROSS-REFERENCE TO RELATED APPLICATION

This application claims benefit of priority to Korean Patent Application No. 10-2019-0101019, filed on Aug. 19, 2019, the entire disclosure of which is incorporated herein by reference.

BACKGROUND

1. Technical Field

The present disclosure relates to a touch screen that may be applied to various types of electronic apparatuses such as, for example, a smart phone and a home appliance.

2. Description of Related Art

A touch screen device is a type of input device for inputting information through screen contact of a display device without a separate input device in various electronic apparatuses. Such touch screen device is used as an input device of not only portable electronic apparatuses such as an electronic organizer, an e-book, a Portable Multimedia Player (PMP), a navigation, Ultra Mobile PC (UMPC), a mobile phone, a smart phone, a smart watch, a tablet PC, a watch phone, and a mobile communication terminal, but also various devices such as an electric range, a refrigerator, a television, a laptop, and a monitor.

A touch panel has advantages that are simple, have fewer malfunctions, are a text input-available without other input device to easily carry, and have a usage method easily sensed by the user, such that it is recently applied to various information processing devices.

The touch screen may include a resistive type for determining a touched location with a voltage gradient according to a resistance in a state where a metal electrode has been formed on the upper plate or the lower plate and a DC voltage has been applied thereto, a capacitive type for sensing a touched portion by forming the equi-potential on a conductive film and sensing the location where the voltages of the upper and lower plates have been changed due to the touch, an electromagnetic induction method for sensing a touched portion by reading a LC value induced due to the touch according to a method for sensing a touched portion. The touch screen may apply various types of touch detecting methods, such as an infrared type, or an ultrasonic type in addition to the resistive type, the capacitive type, and the electromagnetic induction type.

The capacitive type touch screen may detect whether to touch or the touch location based on a change in the voltage due to a touch capacitance ($C_t$) generated by a touch sensor as a touch input tool such as a finger or an electronic pen touches or approaches the touch sensor arranged on the touch screen.

The touch screen may generate a touch signal not intended by a user by other elements (for example, water, moisture, magnets, etc.) other than the touch input tool. For example, when water is stained on a finger touched by the user, an unintended touch signal may be generated by the water.

The touch signal intended by the user may be referred to as a normal touch signal, and the touch signal not intended by the user may be referred to as a ghost touch signal, and the normal touch signal and the ghost touch signal may be referred to as variously any different names.

In the event of a false touch or a ghost touch, the buttons start to operate randomly. In the case of an electric range or an oven, it may be a very dangerous situation. For example, in the automatic cleaning process, a touch error may occur regardless of the consumer's intention, and the items therein may cause safety problems and dangerous situations for the consumer. This is a common problem for all capacitive type touch controllers.

Water and other liquids may be commonly found in a kitchen and a laundry, thereby requiring moisture immunity. For example, although a kettle in a microwave boils over and its contents drop on the touch screen, a touch error should not occur. However, water vapor or fine water droplets may also cause a problem. Accordingly, the touch sensing capability in a state where moisture or water is present has attracted interest to all developers who deal with a touch screen input device of a home appliance.

The conventional touch screen has been a method for distinguishing features of the normal signal and the ghost signal from a specific signal by targeting a touch screen panel (TSP) to remove and compensate it.

An example of a touch screen and a ghost touch removing method thereby in the related art includes touch sensors arranged in a plurality of rows and columns, and a touch drive IC for detecting a touch location based on a touch signal generated from the touch sensors, and discloses a touch screen, which removes by subtracting a low level ghost touch signal included in the touch signal by a first reference value, and adds the first reference value to a high level normal touch signal included in the touch signal to compensate for a signal level reduced in the process of removing the ghost touch signal by the touch drive IC, but this is a method considering only the input touch signal, such that there is a limitation to detect various types of ghost touches not intended by the user.

Another example in the related art discloses a touch screen and a processor for detecting a ghost touch based on at least two of a time interval between touches, a distance between touches, or a touch area for the touches detected through the touch screen, but there has been a limitation that may detect the ghost touch only by a predetermined algorithm, and may not cope with a false touch type that deviates from the ghost touch algorithm.

In the present disclosure, the touch signal not intended by the user is defined as a false touch, and the false touch is defined as including a ghost touch in which a result value by the touch pressure (hereinafter, referred to as a "touch result value") is detected even without the touch input of the user and an obscure touch in which the user touch input is detected but an unintended touch result value is detected. Here, the ghost touch includes a case where there is an input by water droplets or oil even without the touch input by the user's finger, and the obscure touch is a case where the touch input by the user's finger is detected but the unintended touch result value is detected, and a target setting value and the touch result value of the detected touch input are touches inconsistent to each other.

SUMMARY OF THE DISCLOSURE

An object of an embodiment of the present disclosure is to distinguish and remove various false touches occurring in a wider environment through an AI model learned by using an AI technology.

Another object of an embodiment of the present disclosure is to confirm its pattern through artificial neural network learning in various environments such as the false input or no input of a touch pad, and improve the user's experience by enabling more accurate input.

Still another of an embodiment of the present disclosure is to use a neural network model based on reinforcement learning for determining false touch.

The present disclosure is not limited to what has been described above, and other aspects and advantages of the present disclosure will be understood by the following description and become apparent from the embodiments of the present disclosure. Furthermore, it will be understood that aspects and advantages of the present disclosure may be achieved by the means set forth in claims and combinations thereof.

A method and an apparatus for determining a false touch on a touch screen according to an embodiment of the present disclosure for achieving the objects may be performed by inferring a false touch based on an AI technology.

Specifically, a method for determining a false touch on a touch screen of an electronic apparatus may include detecting a touch input in order to obtain a touch result value through the touch screen, detecting at least two of a time interval with a previously input touch input of the detected touch input, a touch area of the touch input, a touch intensity of the touch input, or a temperature of the touch input, inputting data related to at least two of the time interval, the touch area, the touch intensity, or the temperature, which have been detected, to a learned AI model in order to determine a touch type of whether the detected touch input is a normal touch or a false touch, applying the input data to the learned AI model, and outputting whether the detected touch input is a normal touch or a false touch from the learned AI model.

In another embodiment of the present disclosure, the method for determining the false touch may further include removing or calibrating a touch input when the detected touch type is a false touch. The calibrating the false touch input may include at least one of a noise reduction filter adding scheme, a touch sensitivity adjusting scheme, or a touch frequency changing scheme.

In another embodiment of the present disclosure, the method for determining the false touch may further include removing a touch input or calibrating the touch input when the detected touch type is a false touch, and the removing the touch input or calibrating the touch input when the detected touch type may remove the touch input when the detected touch type is a ghost touch, and calibrate the touch input when it is an obscure touch.

In another embodiment of the present disclosure, the calibrating the obscure touch input may include at least one of a noise reduction filter adding scheme, a touch sensitivity adjusting scheme, or a touch frequency changing scheme.

In another embodiment of the present disclosure, a false touch determining device for determining a false touch on a touch screen of an electronic apparatus may include a touch input detector for detecting a touch input in order to obtain a touch result value through the touch screen, and detecting at least two of a time interval of the detected touch input, a touch area of the touch input, a touch intensity of the touch input, or a temperature of the touch input, and a touch type classifier for outputting whether the detected touch input is a normal touch or a false touch from a learned AI model by applying data related to at least two of the time interval of the detected touch input, the touch area of the touch input, the touch intensity of the touch input, or the temperature of the touch input to the learned AI model in order to determine a touch type of whether the detected touch input is a normal touch or a false touch.

In the false touch determining device and the method for determining the false touch according to another embodiment of the present disclosure, the learned AI model may be a normal/false touch classifying engine learned to infer and output whether the detected touch input is a normal touch or a false touch by using at least two of the time interval of a plurality of detected touch inputs, the touch area of the touch input, the touch intensity of the touch input, or the temperature of the touch input, and touch types labeled to the plurality of touch inputs as learning data.

In the false touch determining device and the method for determining the false touch according to another embodiment of the present disclosure, the learned AI model may be a normal/ghost/obscure touch classifying engine learned to classify and output whether the detected touch input is a normal touch, a ghost touch, or an obscure touch by using at least two of the time interval of a plurality of detected touch inputs, the touch area of the touch input, the touch intensity of the touch input, or the temperature of the touch input, and touch types labeled to the plurality of touch inputs as learning data.

In the false touch determining device and the method for determining the false touch according to another embodiment of the present disclosure, the learned AI model may be a normal/false touch classifying engine learned by a classification analysis by using at least two of the time interval, the touch area, the touch intensity, or the temperature, which have been detected, of a plurality of detected touch inputs, and touch types labeled to the plurality of touch inputs as learning data.

In another embodiment of the present disclosure, the false touch determining device for determining the false touch on the touch screen of the electronic apparatus may further include a false touch processor for removing or calibrating a false touch when the detected touch type is a false touch.

In another embodiment of the present disclosure, the false touch processor may remove a touch input when the detected touch type is a ghost touch, and calibrate the touch input when it is an obscure touch, and the calibrating the obscure touch may include at least one of a noise reduction filter adding scheme, a touch sensitivity adjusting scheme, or a touch frequency changing scheme.

In the false touch determining device and the method for determining the false touch according to another embodiment of the present disclosure, the learned AI model may be a reinforcement learning based neural network model configured so that an agent for determining a touch type of whether the touch input is a normal touch or a false touch performs an action for deciding the touch type with respect to a state where at least two of a time interval of the touch input, a touch area of the touch input, a touch intensity of the touch input, or a temperature of the touch input have been given, and the agent receives a reward when the touch type decided by the agent is an intended touch type, and configured so that the agent performs an action in the given state and updates false touch determining performance in order to receive the maximum reward, in an environment that obtains the given state and the action of the agent to return the reward and a next state.

In the false touch determining device and the method for determining the false touch according to another embodiment of the present disclosure, the reinforcement learning based neural network model may be configured to learn simulation scenarios for reinforcement learning having the setting value of the intended target touch as a sequence, and learned to be updated by using each simulation scenario as one episode, and the reward is calculated when the sequence input of each scenario, which is one episode, is terminated.

In the false touch determining device and the method for determining the false touch according to another embodiment of the present disclosure, the reinforcement learning based neural network may use a reinforcement learning based neural network, which is a Deep Q-network.

In another embodiment of the present disclosure, a touch screen system including a false touch determining device for determining a false touch on a touch screen of an electronic apparatus and a server may include a touch input detector for detecting a touch input in order to obtain a touch result value through the touch screen, and detecting at least two of a time interval of the detected touch input, a touch area of the touch input, a touch intensity of the touch input, or a temperature of the touch input, a touch type classifier for outputting whether the detected touch input is a normal touch or a false touch from a learned AI model by applying data related to at least two of the time interval of the detected touch input, the touch area of the touch input, the touch intensity of the touch input, or the temperature of the touch input to the learned AI model in order to determine a touch type of whether the detected touch input is a normal touch or a false touch, and a communicator for communicating with the server, the communicator transmitting to the server at least two of the time interval of a plurality of the touch inputs detected by the touch input detector, the touch area of the touch input, the touch intensity of the touch input, or the temperature of the touch input, and touch types labeled to the touch input, and the server may include an AI model learner for generating the learned AI model that has learned at least two of the plurality of the touch inputs, the touch area of the touch input, the touch intensity of the touch input, or the temperature of the touch input, which have been received, and the touch types labeled to the touch input through a deep neural network, the server may be configured to transmit the learned AI model that has learned through the AI model learner to a false touch determining device, and the touch type classifier of the false touch determining device may be configured to infer a touch type of whether the detected touch input is a normal touch or a false touch through the learned AI model received from the server.

In addition, other methods, other systems, and a computer program for executing the method for implementing the present disclosure may be further provided.

Other aspects, features, and advantages other than those described above will become apparent from the following drawings, claims, and detailed description of the disclosure.

According to an embodiment of the present disclosure, it is possible to determine the touch error by using the AI, the AI based false touch recognition technology, and the 5G network.

According to an embodiment of the present disclosure, it is possible to remove and calibrate the false touch even if the false touch of the type not defined in the false touch algorithm is detected.

In addition, it is possible to solve the user's inconvenience in the home appliance having various touch screens for supporting the touch input.

In addition, it is possible to enable the robust touch input to minimize the influence on the external environment (water, greasy, foreign matter, high temperature).

The effects of the present disclosure are not limited to those mentioned above, and other effects not mentioned may be clearly understood by those skilled in the art from the following description.

BRIEF DESCRIPTION OF THE DRAWINGS

FIG. 5A is a diagram showing learning data for supervised learning of the AI model for determining the false touch of the touch screen according to an embodiment of the present disclosure.

FIG. 5B is a diagram showing test data for supervised learning of the AI model according to an embodiment of the present disclosure.

DETAILED DESCRIPTION

Figure 1:
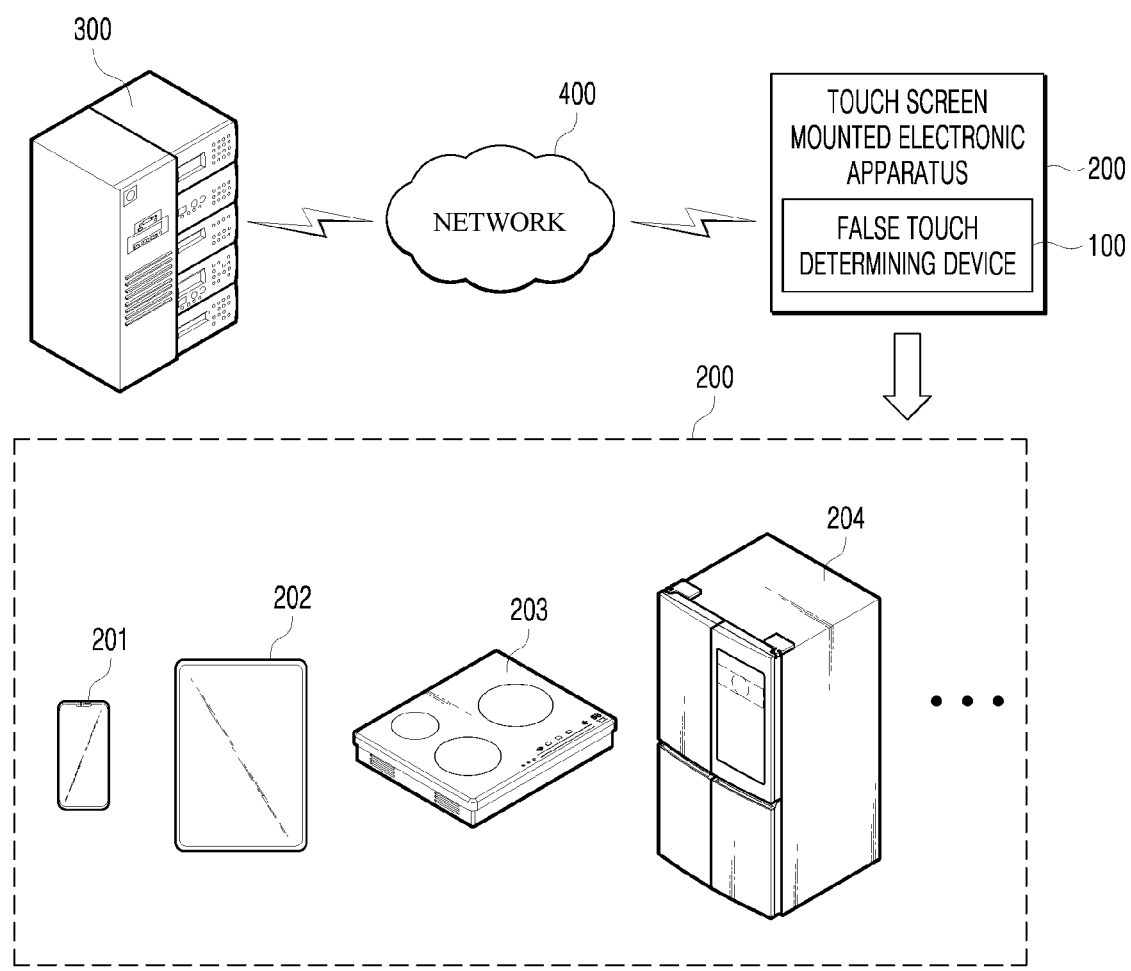
FIG. 1 is an exemplary diagram of a false touch determination environment including an electronic apparatus including a false touch determining device, a server, and a network for connecting them to each other according to an embodiment of the present disclosure.

Advantages and features of the present disclosure and methods for achieving them will become apparent from the descriptions of aspects hereinbelow with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of conditioned features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

FIG. 1 is an exemplary diagram of a false touch determination environment including a touch screen-mounted electronic apparatus including a false touch determining device, a server, and a network for connecting them to each other according to an embodiment of the present disclosure. FIG. 1 is an exemplary diagram of a false touch processing environment including an electronic apparatus including a false touch determining device 100, a server, and a network for connecting them to each other according to an embodiment of the present disclosure. Referring to FIG. 1, a false touch processing environment 1 may include an electronic apparatus 200 including a false touch determining device 100, a server 300, and a network 400. The electronic apparatus 200 including the false touch determining device 100 and the server 300 may be connected to each other in a 5G communication environment.

The touch screen-mounted electronic apparatus 200 may include not only communication devices or home appliances of a smartphone 201, a tablet PC 202, an electric range 203, a refrigerator 204 but also the products integrating combinations of these functions, but is not limited thereto.

The touch screen-mounted electronic apparatus 200, for example, the electronic apparatus may include at least one of a mobile phone, a mobile medical device, a camera, or a wearable device (for example, smart glasses or a head-mounted-device (HIVID)), an electronic clothing, an electronic bracelet, an electronic necklace, an electronic accessory, an electronic tattoo, a smart mirror, or a smart watch.

In some embodiments, the touch screen-mounted electronic apparatus may be a smart home appliance. The smart home appliance may include, for example, at least one of a television, a digital video disk (DVD) player, an audio, a refrigerator, an air conditioner, a cleaner, an oven, a microwave, a washing machine, an air purifier, a set-top box, a home automation control panel, a security control panel, a TV box (for example, Apple TV™ or Google TV™), a game console (for example, Xbox™, PlayStation™), an electronic dictionary, an electronic key, a camcorder, or an electronic picture frame.

In another embodiment, the electronic apparatus may include at least one of various medical devices (for example, various portable medical measuring devices (such as a blood glucose meter, a heart rate monitor, a blood pressure monitor, or a body temperature meter), magnetic resonance angiography (MRA), magnetic resonance imaging (MM), computed tomography (CT), an imaging device, or a ultrasonic device), a navigation device, a global positioning system receiver (GPS), an event data recorder (EDR), a flight data recorder (FDR), an automotive infotainment device, an electronic equipment for ships (for example, a ship navigation system, a gyro compass, etc.), avionics, a security device, a head unit for vehicle, an industrial or home robot, an automatic teller's machine of a financial institution, point of sales (POS) of a store, or the Internet of things device (for example, a light bulb, a sensor, an electric or gas meter, a sprinkler device, a fire alarm, a thermostat, a street light, a toaster, an exercise equipment, a hot water tank, a heater, a boiler, etc.).

The false touch determining device 100 may use the server 300 for the purpose of learning an AI model for determining a false touch on a touch screen. For example, the false touch determining device 100 may include an AI model learner 134 and directly generate by itself and use the AI model learned for determining whether the touch input on the touch screen is a normal touch or a false touch, but the server 300 may include the AI model learner 134, and also use the data in the form of big data collected by the server 300 instead.

The false touch determining device 100 may use various programs related to an AI algorithm stored in a local area or stored in the server 300. That is, the server 300 may serve as learning the AI model by using data collected together with data collection. The false touch determining device 100 may determine whether the touch input of the touch screen based on the generated AI model is a normal touch or a false touch, and control to remove or calibrate the touch input in case of a false touch.

The server 300 may provide the user terminal with training data necessary for false touch inference by using an AI algorithm and various programs, for example, an API and a workflow, related to the AI algorithm. That is, the server 300 may learn the AI model by using the training data including a time interval with the previously detected touch input of a plurality of detected touch inputs, a touch area of the detected touch input, and the touch inputs labeled to the touch inputs. In addition, the server 300 may evaluate the AI model, and even after the evaluation, may update the AI model for better performance. Here, the false touch determining device 100 may perform a series of operations performed by the server 300 alone or together with the server 300.

The network 400 may be any suitable communication network including a wired and wireless network, for example, a local area network (LAN), a wide area network (WAN), an internet, an intranet, an extranet, and a mobile network, for example, cellular, 3G, LTE, 5G, WiFi networks, an ad hoc network, and a combination thereof.

The network 400 may include a connection of network elements such as a hub, a bridge, a router, a switch, and a gateway. The network 400 may include one or more connected networks, including a public network such as the Internet and a private network such as a secure corporate private network. For example, the network may include a multi-network environment. The access to the network 400 may be provided via one or more wired or wireless access networks. Hereinafter, a false touch determining system and a false touch determining device 100 according to an embodiment of the present disclosure will be described in detail.

Figure 2A:
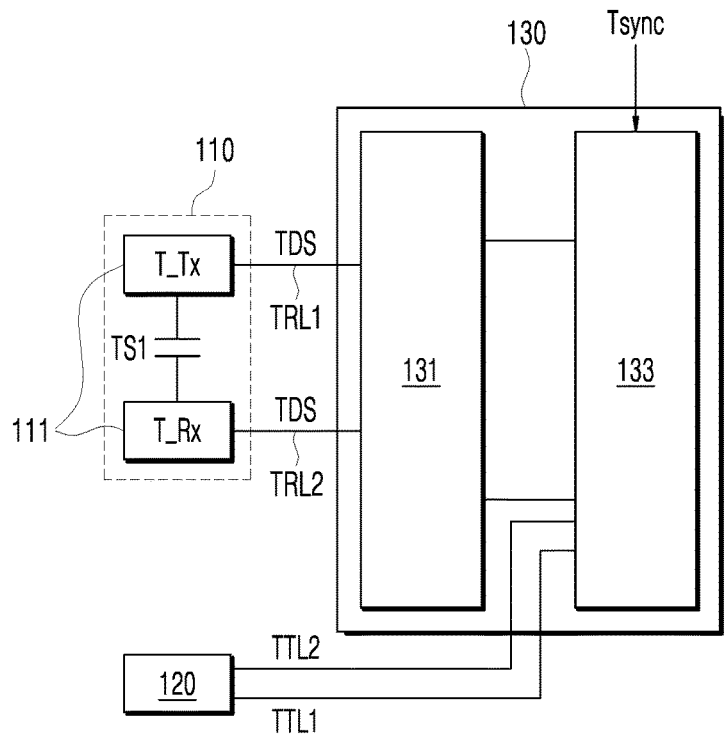
FIG. 2A is a diagram showing a structure of a touch driving circuit of a capacitive type touch screen device according to an embodiment of the present disclosure.

FIG. 2A is a diagram showing a structure of a touch driving circuit 130 of the capacitive type touch screen device 100 according to an embodiment of the present disclosure. As shown in FIG. 2A, the touch driving circuit 130 may be composed of one integrated circuit connected to a touch screen 110 such as the touch drive IC. At this time, the touch driving circuit 130 may be connected to the touch screen 110 through a flexible circuit board, and mounted on the flexible circuit board. The touch driving circuit 130 may be electrically connected to the touch part 111 and the temperature sensor 120 of the touch screen 110.

The touch driving circuit 130 may be connected to have one-to-one correspondence with a touch driving electrode (T_Tx) of the touch part 111 through a plurality of first touch routing lines (TRL1) and connected to have one-to-one correspondence with a plurality of touch sensing electrodes (T_Rx) prepared in the touch part 111 through a plurality of second touch routing lines (TRL2). In addition, the touch driving circuit 130 may be connected with a temperature sensor 118 through the first and second temperature routing lines (TTL1, TTL2).

The touch driving circuit 130 may include a sensor 131, a touch control circuit 133, and a memory 135.

The sensor 131 generates a touch driving signal (TDS) having at least one touch driving pulse under the control of the touch control circuit 133, provides the touch driving signal (TDS) to the plurality of touch driving electrode (T_Tx) through each of the plurality of first touch routing lines (TRL1) according to a predetermined order based on a touch channel selection signal provided from the touch control circuit 133, and connects with the plurality of touch sensing electrodes (T_Rx) through each of a plurality of second touch routing lines (TRL2) based on the touch channel selection signal.

The touch control circuit 133 is a Micro Controller Unit (MCU), may receive a touch sync signal (Tsync) supplied from the outside, and control a driving timing of the touch driving circuit 130 based on the received touch sync signal (Tsync).

The touch control circuit 133 may receive the temperature measured by the temperature sensor 120 of the temperature sensor to decide the temperature inside an electronic device (strictly speaking, inside the touch part 111).

In general, when the temperature increases, not only the movement of atoms forming crystals is active but also the vibration movement of atoms forming a lattice is active, thereby disturbing the movement of electrons in the material. Accordingly, in the case of a conductor such as a metal, the electrical resistance increases as the temperature increases.

In the present disclosure, the temperature sensor 120 is configured by using this principle. That is, in the present disclosure, the temperature sensor 120 may be formed of a metal such as Ag, Au, or Al to measure a resistance value according to temperature, thereby measuring a change in temperature.

Figure 2B:
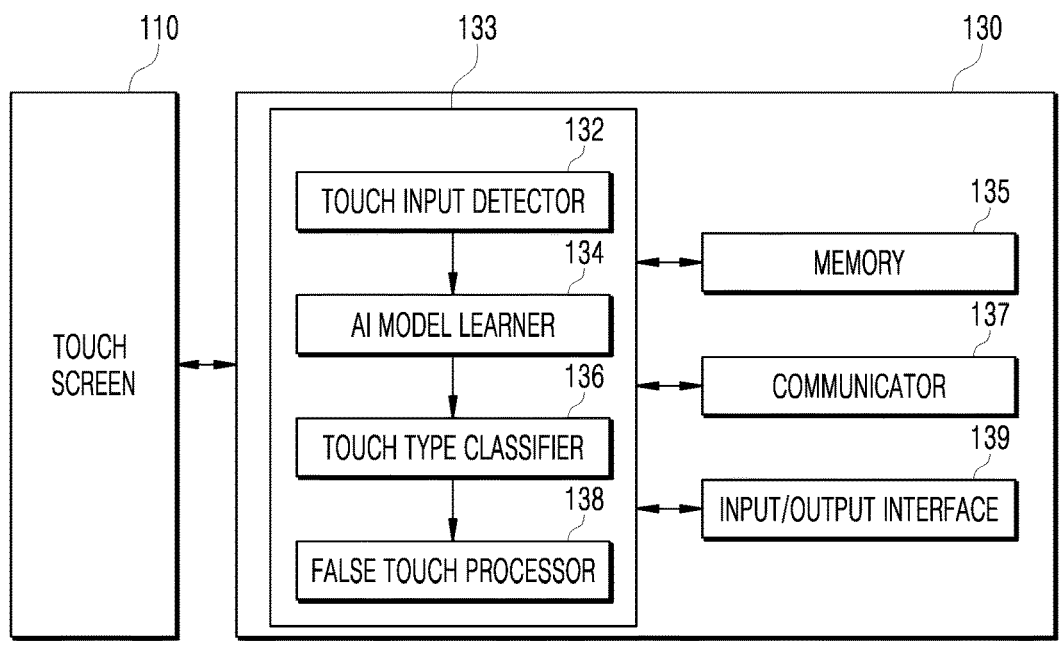
FIG. 2B is a block diagram of the touch screen device according to an embodiment of the present disclosure.

FIG. 2B is a block diagram of a touch screen device according to an embodiment of the present disclosure.

The false touch device 100 may include the touch screen 110 and the touch driving circuit 130 for driving the touch screen 110. The touch driving circuit 130 may include the touch sensor 131 and the touch control circuit 133, and the touch control circuit 133 may include a touch input detector 132 for detecting data related to a touch input from the touch sensor 131, the AI model learner 134 for learning through a deep neural network based on the detected data, a touch type classifier 136, a false touch processor 138, a memory 135 for storing various data such as the touch input data and the learning data, a communicator 137 for communicating with a server or an external device, and an input/output adjuster 139 of the false touch determining device.

The touch input detector 132 may detect a touch input to obtain a touch result value based on the touch signals and the temperature signals sensed by the touch detector 131, and detect a time interval with the previously input touch input of the detected touch input, a touch area, a touch intensity (sensitivity), a distance between the touches, and a temperature upon touch of the touch input. The touch interval, the touch distance, the touch area, the touch intensity, and the temperature upon touch may be detected as measured values through the touch input detector 132. In another embodiment of the present disclosure, the touch interval, the touch distance, the touch area, the touch intensity, and the temperature upon touch may be displayed as a relative value with a predetermined reference touch interval ($\alpha$: 1 ms), a reference touch distance ($\beta$: 1 cm), a reference touch area ($\Phi$: 1 cm$^2$), a reference touch intensity ($\delta$: 1 pF, or 1 Pa/L), and a reference touch temperature ($\varepsilon$: 1° C.), respectively, through the touch input detector 132. For example, since the time interval and the touch distance of the touch inputs may be obtained from two or more touch inputs, they are regarded as the reference time interval and the reference touch distance to be processed as the predetermined reference time interval and the reference time distance, or regarded as no time interval to be processed as zero.

The touch type classifier 136 may apply at least two data of the time interval with the previously input touch input of the detected touch input, the detected touch area, touch distance, touch intensity, or temperature upon touch to the learned AI model in order to determine the touch type of whether the detected touch input is a normal touch or a false touch to output whether the detected touch input is a normal touch or a false touch from the learned AI model.

The AI model learner 134 may be configured to learn a normal/false touch classifying engine so as to output by inferring whether the detected touch input is a normal touch or a false touch by using at least two of the touch time interval of the previously input touch input with the previously input touch input of the detected touch inputs, the touch area of the detected touch inputs, the detected touch area, the touch distance between the detected touch inputs, the touch intensity of the detected touch inputs, or the temperature upon touch of the detected touch inputs, and the touch types labeled to the touch inputs as learning data. In an embodiment of the present disclosure, since the environmental information of the touch input suitable for detecting the false touch may vary according to the type of the touch screen, at least two most suitable for detecting the false touch among the touch area of the detected touch inputs, the detected touch area, the touch distance between the detected touch inputs, the touch intensity of the detected touch inputs, or the temperature upon touch of the detected touch inputs may be selected through learning. For example, in the case of the capacitive type touch screen, the touch time interval and the touch area may be used as the environmental information of the touch input for classifying the false touch, and in the case of a pressure sensitive type touch screen, the touch interval and the touch intensity may be used as the environmental information of the touch input.

The AI model learner 134 may generate the AI model by using supervised learning, but learn the normal/false touch classifying engine by using unsupervised learning or reinforcement learning. For example, the AI model learner 134 may learn the normal/false touch classifying engine through a machine learning algorithm of classification or regression analysis, and deep neural networks of a DNN, a CNN, and a RNN. Learning of the normal/false touch classifying engine by the classifying supervised learning is described in FIGS. 5A to 5E, and the neural network learning based on reinforcement learning is described in FIGS. 7A to 7C.

The touch type classifier 136 may determine the touch type whether the touch input detected by the touch input detector 132 is a normal touch or a false touch through the AI model learned by the AI model learner 134. In another embodiment of the present disclosure, as described above, the touch type classifier 136 may be configured to determine whether the touch input is a normal touch or a false touch through the learned AI model received from the server 300.

The false touch processor 138 may remove the touch input signal of the ghost touch according to the touch type determined by the touch type classifier 136, calibrate the touch input signal of the obscure touch, and maintain the touch input signal of the normal touch as it is. The touch control circuit 133 that has received the touch input signal calibrated or maintained as it is from the false touch processor 138 may control to display the touch result value of the touch input.

In an embodiment of the present disclosure, a false touch calibrating scheme may be at least one of a noise reduction filter adding scheme, a touch sensitivity adjusting scheme, or a touch frequency changing scheme. The noise reduction filter adding scheme may include a software component that calibrates a touch error by applying at least one noise reduction filter according to the number of error occurrences. The touch sensitivity adjusting scheme may also include a software component that calibrates a touch error by adjusting the touch sensitivity according to the number of error occurrences. In order to solve the noise problem, the frequency changing scheme allows a controller to filter out the noise of a common mode and avoid the noise problem by using a frequency hopping scheme.

If the false touch determining device 100 is included in a smart phone, an electric range, a notebook, a desktop computer, etc. in a method executed in a program or app form, the false touch determining device 100 may not include the communicator 103 in the form of a program, and in this case, may communicate with an external device by using the communicator 103 such as a smartphone, an electric range, a laptop, or a desktop computer in which the false touch determining device 100 has been embedded through the input/output adjuster 104.

Figure 3A:
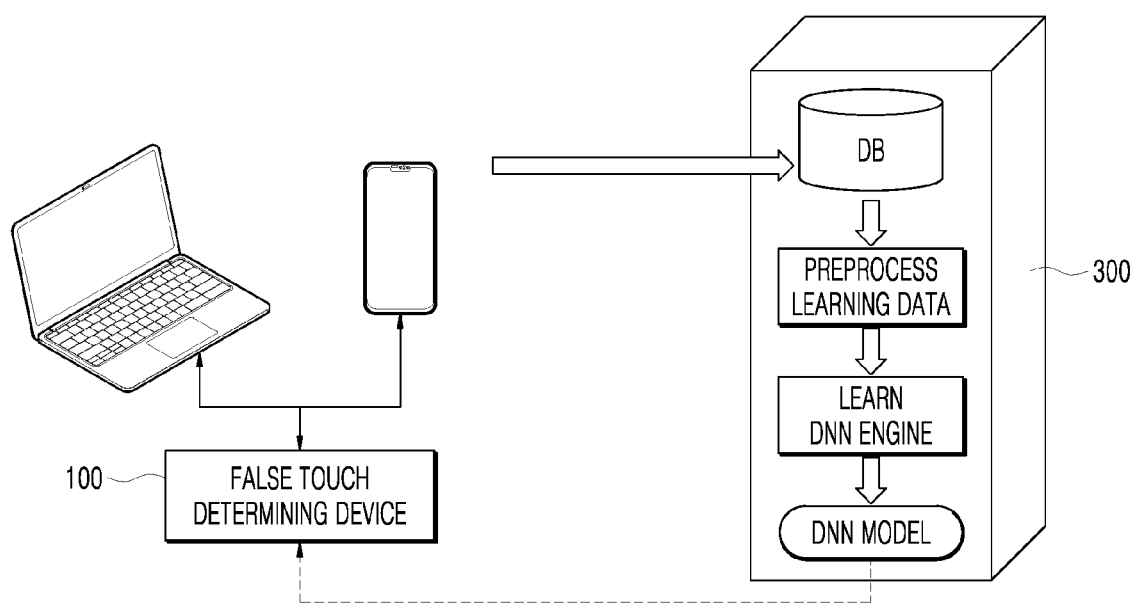
FIG. 3A is an exemplary diagram of a false touch determining system of the touch screen according to an embodiment of the present disclosure.

FIG. 3A is an exemplary diagram of a false touch determining system of a touch screen according to an embodiment of the present disclosure.

The false touch determining system may include the false touch determining device 100 capable of determining the false touch of the touch screen and the server 300. The false touch determining device 100 may be executed in the form of a program or an application app in a smartphone, a tablet PC, an electric range, etc., and embedded in a home appliance, etc.

The communicator 137 of the false touch determining device 100 may transmit at least one of the time interval, the touch area, the touch intensity, or the temperature upon touch of the touch inputs detected by the touch input detector 132 and the touch result values to the server.

The server 300 may include the AI model learner for collecting at least two of the time interval, the touch area, the touch intensity, or the temperature upon touch of the detected and collected touch inputs and generating the learned AI model learned through the deep neural network (DNN). The AI model learner of the server may be configured to extract the learning data necessary for learning through the deep neural network from the database having stored the false touch data necessary for machine learning or deep learning, to preprocess the learning data in order to increase the accuracy of the learning data, to learn the learning data through the deep neural network (DNN), and to generate the learned AI model.

Data preprocessing refers to removing or modifying learning data to maximally increase the accuracy of source data. In addition, if it contains excessively data whose importance is significantly low, they may also be properly scaled down to a form that is easy to manage and use. The data preprocessing includes data refinement, data integration, data transformation, data reduction, etc. The data refinement is to fill missing values, to smooth noisy data, to identify outliers, and to calibrate data inconsistency.

The server 300 may be configured to transmit the learned AI model learned through the AI model learner to the false touch determining device 100. The touch type classifier 136 of the false touch determining device 100 may be configured to classify and determine a normal touch and a false touch (ghost touch, obscure touch) of the touch screen through the learned AI model received from the server.

Figure 3B:
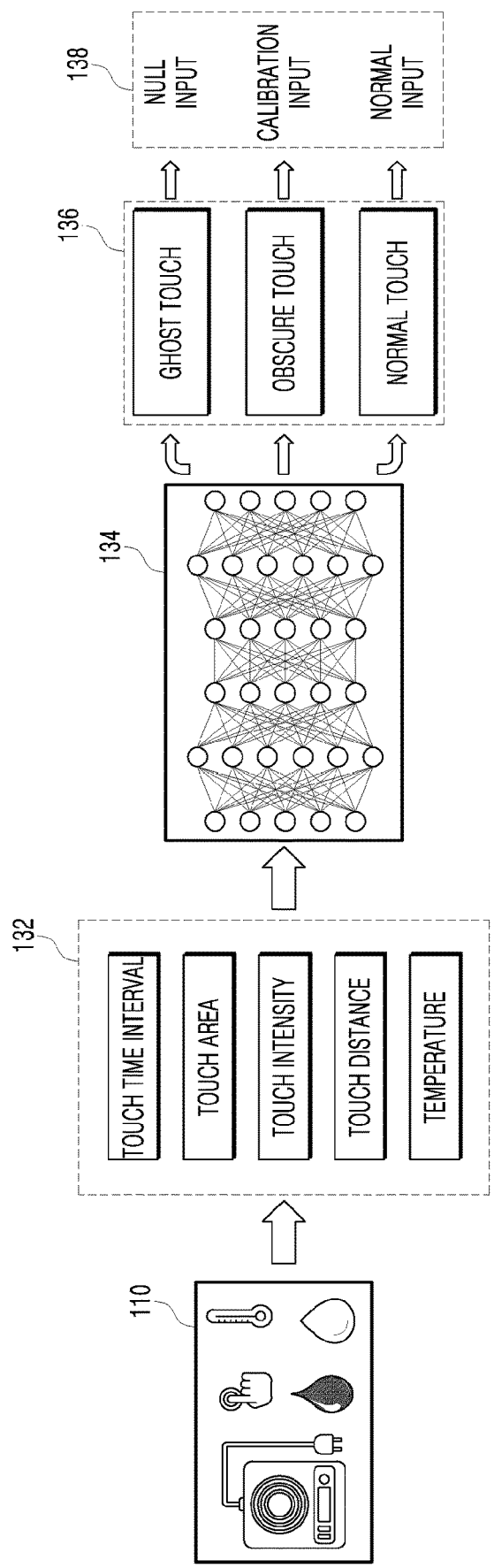
FIG. 3B is a flowchart showing the function of the false touch determining device of the touch screen according to an embodiment of the present disclosure.

FIG. 3B is a flowchart showing a function of the false touch determining device of the touch screen according to an embodiment of the present disclosure.

The false touch determining device 100 may sense a touch on the touch screen 110 through the touch sensor 131, and detect the touch input, the time interval with the previously input touch input of the touch input, the touch area, the touch intensity (in the case of the pressure sensitive type touch screen), the temperature upon touch, and the touch distance of the touch input. In addition, information on a touch type [normal touch, false touch (ghost touch, obscure touch)] labeled to the touch input may be obtained to learn the AI neural network for determining the false touch.

In an embodiment of the present disclosure, the information on the touch type of the touch input may be experimentally determined and input by an experimenter during the touch input test. The experimenter may directly touch and then confirm the input touch input location to manually label which kind of touch type (Ghost, Obscure, Normal) it has been touched, thereby constructing the learning data.

In another embodiment of the present disclosure, a vision sensor may be installed on the touch screen to collect the data of the touch type of the normal touch or the false touch by using whether the value labeled to the specific touch input coincides with the touch result value when the experimenter touches the specific portion through vision recognition. If the touch result value is obtained even if it has been determined that no touch is detected the vision recognition, it may be recorded as a ghost touch, and if the labeled value of the specific touch input location recognized by the vision recognition does not coincide with the touch result value of the touch input, it may be determined and recorded as an obscure touch, and otherwise, it may be determined and recorded as a normal touch. The label recognition of the specific touch input location of the touch screen by vision recognition may be used for vision recognition by using that a part touched by the experimenter's fingertip is covered by the fingertip. For example, if the tip of the experimenter's finger covers the 'timer' part of the electric range, the vision recognition algorithm recognizes the 'timer' part by comparing the covered part to the entire electric range before covering to decide the touch type of a false touch or a normal touch by using whether the 'timer' coincides with the touch result value.

The touch type classifier 136 for detecting the data for determining the false touch and including the normal/false touch classifying engine learned in the AI model learned 134 may infer and determine the touch type. The false touch processor 138 may remove the touch input signal in the case of ghost touch, calibrate the obscure touch, and determine as the normal input to maintain it based on the result determined by the touch type classifier 136. In the case of the false touch (ghost touch, obscure touch), the false touch may be calibrated by using at least one of a noise reduction filter adding scheme, a touch sensitivity adjusting scheme, or a touch frequency changing scheme.

Figure 4A:
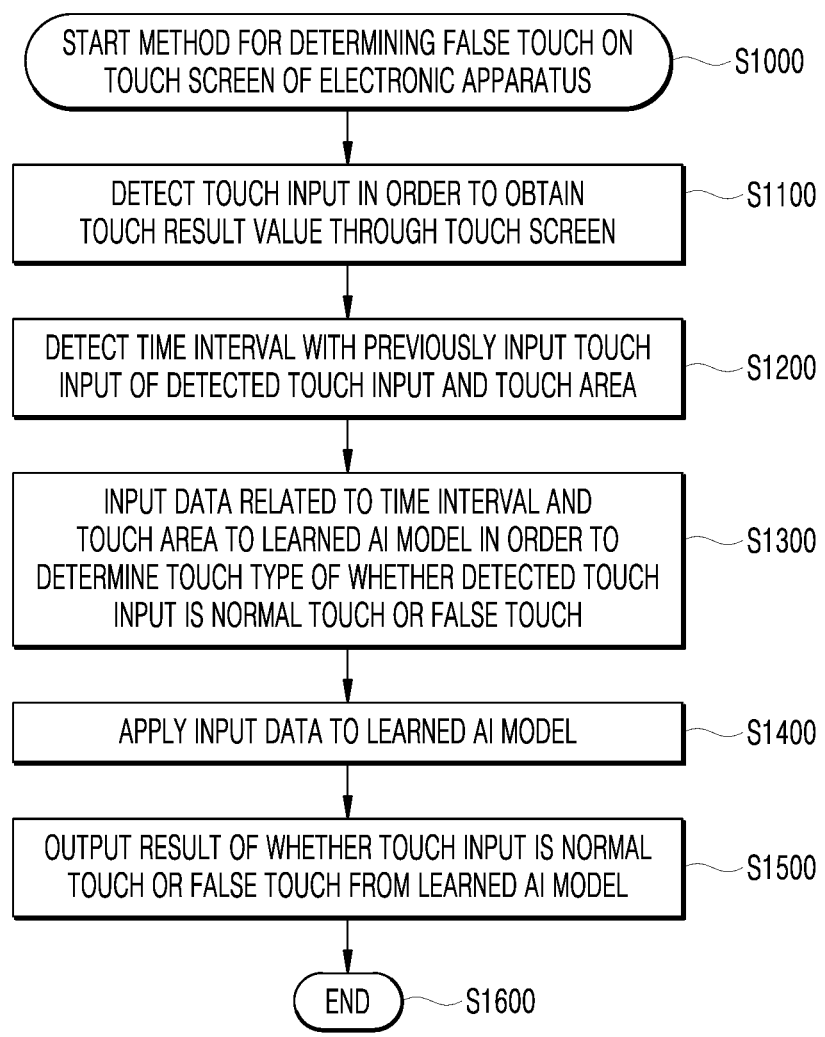
FIG. 4A is a detailed flowchart of a method for determining the false touch in the touch screen of the electronic apparatus according to an embodiment of the present disclosure.

FIG. 4A is a detailed flowchart of a method for optimizing a screen by inferring the image quality of the screen or the content of the screen on the display 105.

A method for determining a false touch on the touch screen of the electronic apparatus is automatically started when the power of the electronic apparatus is turned on (operation S1000).

The touch input detector 132 of the false touch determining device 100 detects a touch input in order to obtain a touch result value through the touch sensor 131 of the touch screen (operation S1100).

The touch input detector 132 may detect a time interval with a previously input touch input of the detected touch input and a touch area of the touch input (operation S1200). In addition, the touch control circuit 133 may detect related elements of additional touch input, for example, a touch intensity (pressure sensitive type touch screen), a touch temperature, a touch distance, etc. in order to determine a false touch.

The touch input detector 132 or the server 300 that has received the data related to the touch input inputs the data related to the time interval with the previously input touch input of the detected touch input and the detected touch area to the AI model learned to determine the touch type of whether the detected touch input is a normal touch, a ghost touch, or an obscure touch (operation S1300). The touch control circuit 133 or the server 300 that has received the data related to or the touch input may also input the related elements of the additional touch inputs, for example, a touch intensity (pressure sensitive type touch screen), a touch temperature, and a touch distance additionally or independently in order to learn the AI model for determining the false touch.

The AI model learner 134 of the false touch determining device 100 or the server 300 that has received the data related to the touch input applies the input data to the learned AI model (operation S1400).

The learned AI model outputs a touch type of whether the detected touch input is a normal touch or a false touch (operation S1500). In another embodiment, the learned AI model may output three classifications of whether the detected touch input is a normal touch, a ghost touch, or an obscure touch. When the touch type is output, the method for determining a false touch is terminated (operation S1600).

In an embodiment of the present disclosure, a program programmed to execute the method for determining the false touch may be stored in a computer readable recording medium.

Figure 4B:
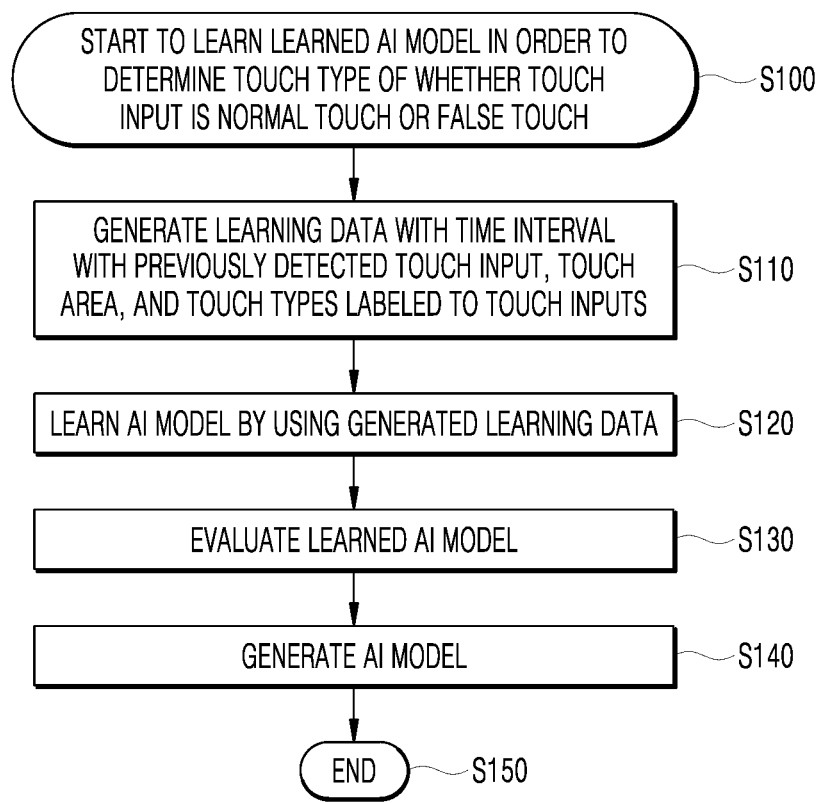
FIG. 4B is a flowchart for learning an AI model for determining the false touch in the touch screen of the electronic apparatus of FIG. 4A.

FIG. 4B is a flowchart for learning an AI model for determining a false touch on the touch screen of the electronic apparatus of FIG. 4A.

FIG. 4B shows a process of learning a normal/false touch classifying engine, which is an AI model used in the method for determining the false touch on the touch screen of the electronic apparatus shown in FIG. 4A. The AI model learning for determining a false touch to be applied in the false touch determining device 100 is started (operation S100). Learning of the normal/false touch classifying engine may be performed in any one of supervised learning, unsupervised learning, and reinforcement learning.

Learning data of the normal/false touch classifying engine including a time interval with a previously detected touch input, a touch area, and touch types labeled to the touch inputs may be generated (operation S110). A normal/false touch classifying engine model may be learned to infer and output whether the detected touch input is a normal touch, or a false touch (ghost touch and obscure touch) by using the time interval with the previously detected touch input of the detected touch inputs, the touch area of the detected touch inputs, and the touch types labeled on the touch inputs as learning data. In another embodiment of the present disclosure, the learning data of the normal/false touch classifying engine including at least two of time interval with the previously detected touch input, a touch area, a touch intensity, a touch distance, a temperature and the touch types labeled to the touch inputs may be generated. A part of the learning data is separated from the test data, and the learning data does not overlap the test data.

The AI model learner 134 of the false touch determining device 100 or the server 300 that has received the data related to the touch input learns the normal/false touch classifying engine by inputting the generated learning data (operation S120). The AI model may apply, for example, a classification and regression algorithm of machine learning, and apply an artificial neural network model such as a CNN. In an embodiment of the present disclosure, for example, the AI learning model may be tuned and used by using TensorFlow or Keras, which is an AI language library used for AI programming.

An AI model is generated through evaluation of the learned normal/false touch classifying engine (operation S130) (operation S140). The evaluation of the learned normal/false touch classifying engine (operation S130) is performed by using the test data. When the AI model is generated, a process of generating the learned AI model in order to determine the touch type is terminated (operation S150). The learned AI model throughout the present disclosure means learning the learning data and deciding the learned model after testing through the test data even without special mention. Hereinafter, the AI model for determining the false touch will be further described.

The artificial intelligence (AI) is one field of computer science and information technology that studies methods to make computers mimic intelligent human behaviors such as reasoning, learning, self-improving and the like.

In addition, the artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may take an approach that builds models for deriving predictions and decisions from inputted data.

Many Machine Learning algorithms have been developed on how to classify data in the Machine Learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network may include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

The Artificial Neural Network may include network models of the method such as Deep Neural Network (DNN), Recurrent Neural Network (RNN), Bidirectional Recurrent Deep Neural Network (BRDNN), Multilayer Perceptron (MLP), and Convolutional Neural Network (CNN), but is not limited thereto.

The terms "layer" and "hierarchy" may be used interchangeably herein.

An ANN may be classified as a single-layer neural network or a multi-layer neural network, based on the number of layers therein.

In general, a single-layer neural network may include an input layer and an output layer.

In addition, a general Multi-Layer Neural Network is composed of an Input layer, one or more Hidden layers, and an Output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The output layer receives a signal from the hidden layer and outputs an output value based on the received signal. The Input signal between neurons is multiplied by each connection strength (weight) and then summed, and if the sum is larger than the threshold of the neuron, the neuron is activated to output the output value obtained through the activation function.

Meanwhile, the Deep Neural Network including a plurality of Hidden layers between the Input layer and the Output layer may be a representative Artificial Neural Network that implements Deep Learning, which is a type of Machine Learning technology.

The Artificial Neural Network may be trained by using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data may classify or cluster inputted data according to a pattern within the inputted data.

Throughout the present specification, an artificial neural network trained using training data may be referred to as a trained model.

Hereinbelow, learning paradigms of an artificial neural network will be described in detail.

The learning method of the Artificial Neural Network may be largely classified into Supervised Learning, Unsupervised Learning, Semi-supervised Learning, and Reinforcement Learning.

The Supervised Learning is a method of the Machine Learning for inferring one function from the training data.

Then, among the thus inferred functions, outputting consecutive values is referred to as regression, and predicting and outputting a class of an input vector is referred to as classification.

In the Supervised Learning, the Artificial Neural Network is learned in a state where a label for the training data has been given.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One of semi-supervised learning techniques involves guessing the label of unlabeled training data, and then using this guessed label for learning. This technique may be used advantageously when the cost associated with the labeling process is high.

The Reinforcement Learning is a theory that if an agent may determine what action should be done every moment, then it is possible to find the best path with experience without data.

The Reinforcement Learning may be mainly performed by a Markov Decision Process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters may be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Accordingly, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters may be set to optimal values that provide a stable learning rate and accuracy.

Figure 5A:
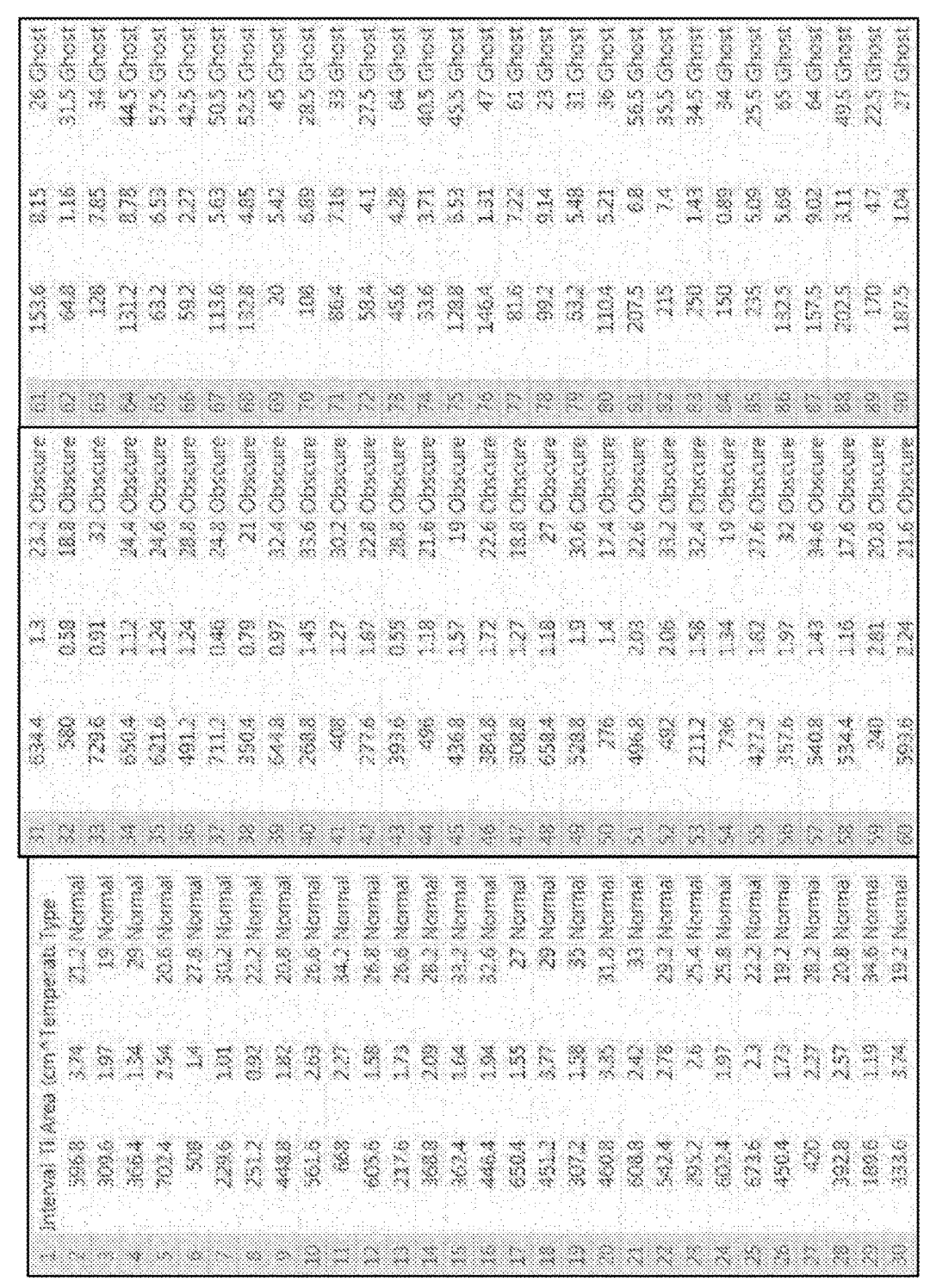

FIG. 5A is learning data for supervised learning of the AI model for determining the false touch of the touch screen according to an embodiment of the present disclosure.

The learning data of FIG. 5A includes data of a time interval with a previously input touch input of the touch input detected by the touch input detector 132, a touch area of the touch input, and a temperature and a touch type. The touch type may be determined by the experimenter, and the experimenter may automatically label it by identifying a part touched on the touch screen as the vision recognition by using the vision sensor. The learning data of FIG. 5A, which are the states of the touch input, includes 89 data sets collected for a normal touch, an obscure touch, and a ghost touch, which are a touch type, but is not limited thereto, and the normal/false touch classifying engine may be learned by collecting even more learning data. In addition, the touch result value may also be classified into two touch types of a normal touch and a false touch. In another embodiment of the present disclosure, the data of the touch interval, the touch distance, and the temperature upon touch may be data expressed as a relative value with a predetermined reference touch interval ($\alpha$: 1 ms), a reference touch area ($\Phi$: 1 cm$^2$), and a reference temperature upon touch ($\epsilon$: 1° C.) through the touch input detector 132, respectively.

The collecting and storing the learning data may collect and store videos and images in the server 300. The learning data of the normal/false touch classifying engine may be subjected to data preprocessing and data augmentation process in order to obtain accurate learning result.

FIG. 5B is a diagram showing test data for supervised learning of the AI model according to an embodiment of the present disclosure.

The test data is configured separately from the learning data by randomly extracting from the test data so as not to overlap the learning data. The test data of FIG. 5A in the touch input includes 46 data sets collected for a normal touch, an obscure touch, and a ghost touch, which are a touch type, but is not limited thereto, and even more test data may be collected and used to verify the normal/false touch classifying engine according to the size of the learning data. A ratio of the learning data and the test data may vary according to the amount of data, and may be generally defined as a ratio of 7:3. The collecting and storing the learning data may be executed in advance in the manufacturing process of the electronic apparatus equipped with the touch screen.

Figure 5C:
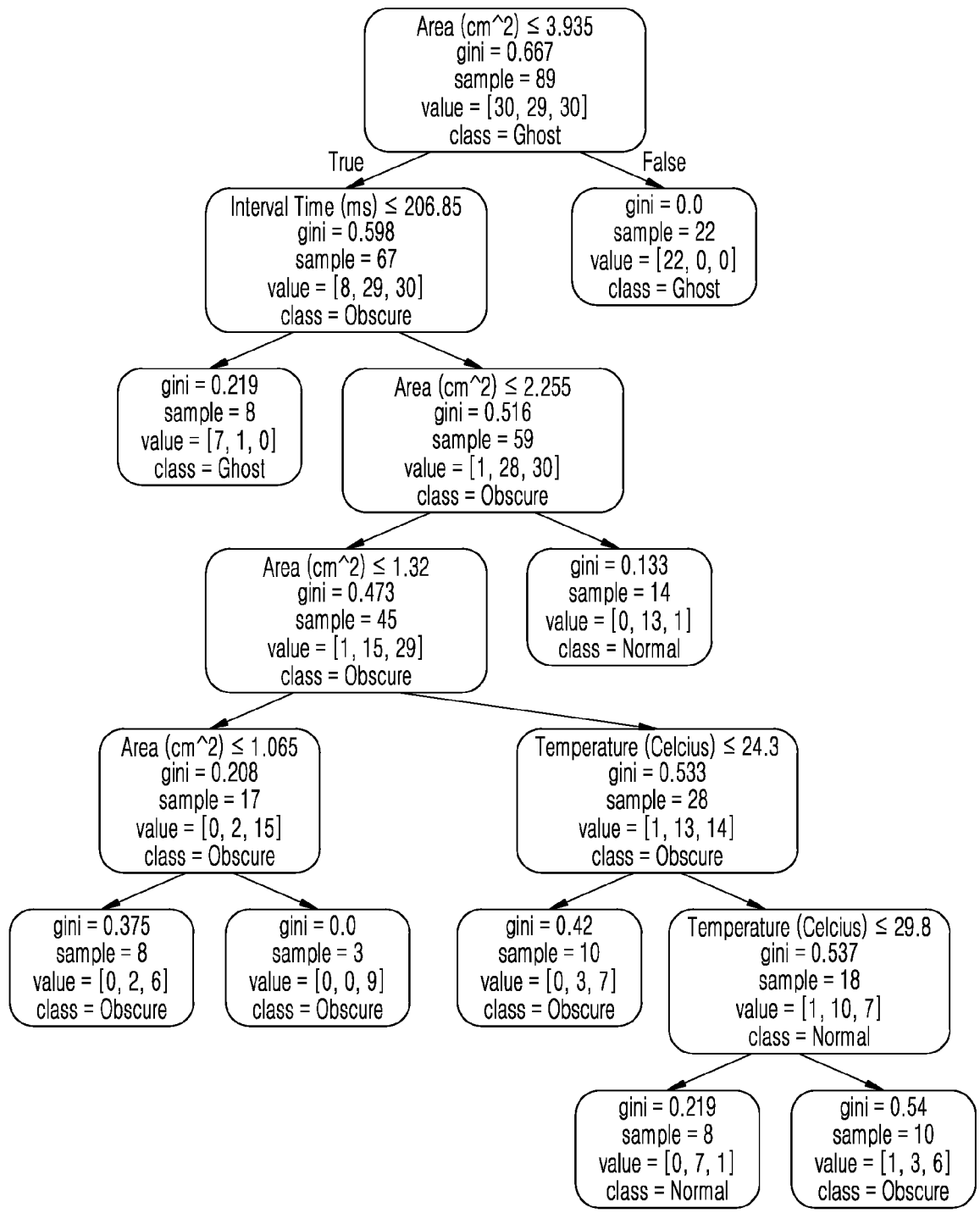
FIG. 5C is a diagram showing the result that has output the learning data according to a CART algorithm in order to generate a decision tree according to the learning data of FIG. 5A.

FIG. 5C is a diagram showing a result of outputting learning data according to a CART algorithm in order to generate a decision tree according to the learning data of FIG. 5A.

The decision tree used in machine learning is a kind of a decision support tool that maps decision rules and their results into a tree structure, and is a model widely used for classification and regression problems. Basically, the decision tree learns by continuing the question of yes/no binary classification in order to reach a final decision. A Classification And Regression Tree (CART) algorithm splits the branch of a tree into binary by using either the Gini Index or the reduction in variance. The CART technique creates a decision tree by splitting a subset of the data set by using all the predictor variables in order to start with the entire data set and repeatedly create two child nodes.

FIG. 5C is a diagram showing a result of classifying through the CART algorithm based on Gini Impurity. FIG. 5C shows the result of a root node having an area≤3.535, a terminal node having an area≤1.065, and a temperature≤29.8.

Figure 5D:
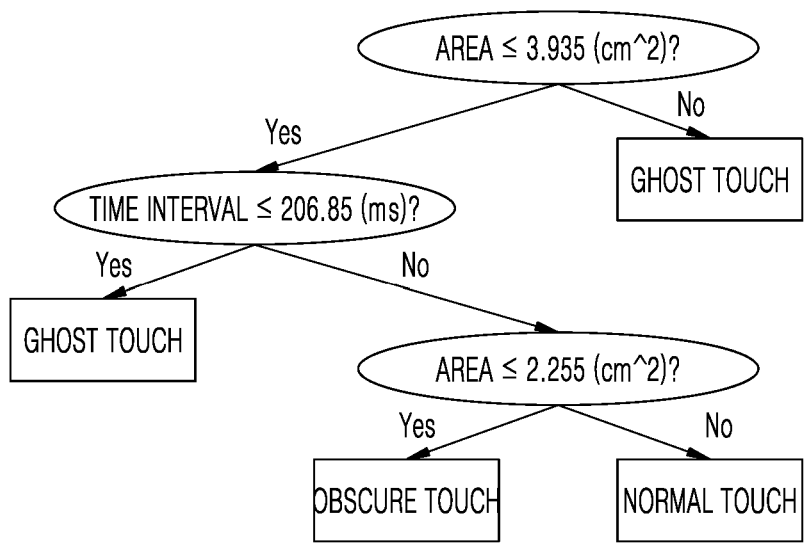
FIG. 5D is a diagram showing the decision tree created according to the output result of FIG. 5C.

FIG. 5D is a diagram showing a decision tree created according to a result of applying and outputting the CART algorithm of FIG. 5C by inputting the learning data of FIG. 5A.

Since the decision tree of FIG. 5C has a deep node depth, the risk of over-fitting is high. FIG. 5D is a result of removing a temperature node by pruning from a loop node to a third load in order to reduce the risk of over-fitting. FIG. 5D has classified a ghost touch, an obscure touch, and a normal touch by area and time interval. In another embodiment of the present disclosure, since the ghost touch and the obscure touch belong to the false touch, the touch type may be classified into a normal touch and a false touch.

According to the decision tree result of FIG. 5D, when 3.935 (cm$^2$)<area, or a time interval≤206.85 (cm$^2$), it is a ghost touch, when 206.85 (ms)<time interval and area≤2.255 (cm$^2$), it is an obscure touch, and when 206.85 (ms)<time interval and 2.255 (cm$^2$)≤area≤3.935 (cm$^2$), it is a normal touch. According to such a machine learning algorithm, the touch type classifier 136 of the false touch determining device 10 may classify and determine the touch type.

FIG. 5D shows only the decision tree structure of the area and the touch time interval of the touch input, but when a touch intensity, a touch distance, and a temperature upon touch in addition to the area and time interval of the touch input may be learned as the input of the normal/false touch classifying engine, learning data for them may be collected to obtain a decision tree analysis result by the CART algorithm of FIG. 5C, and to obtain a decision tree.

Figure 5E:
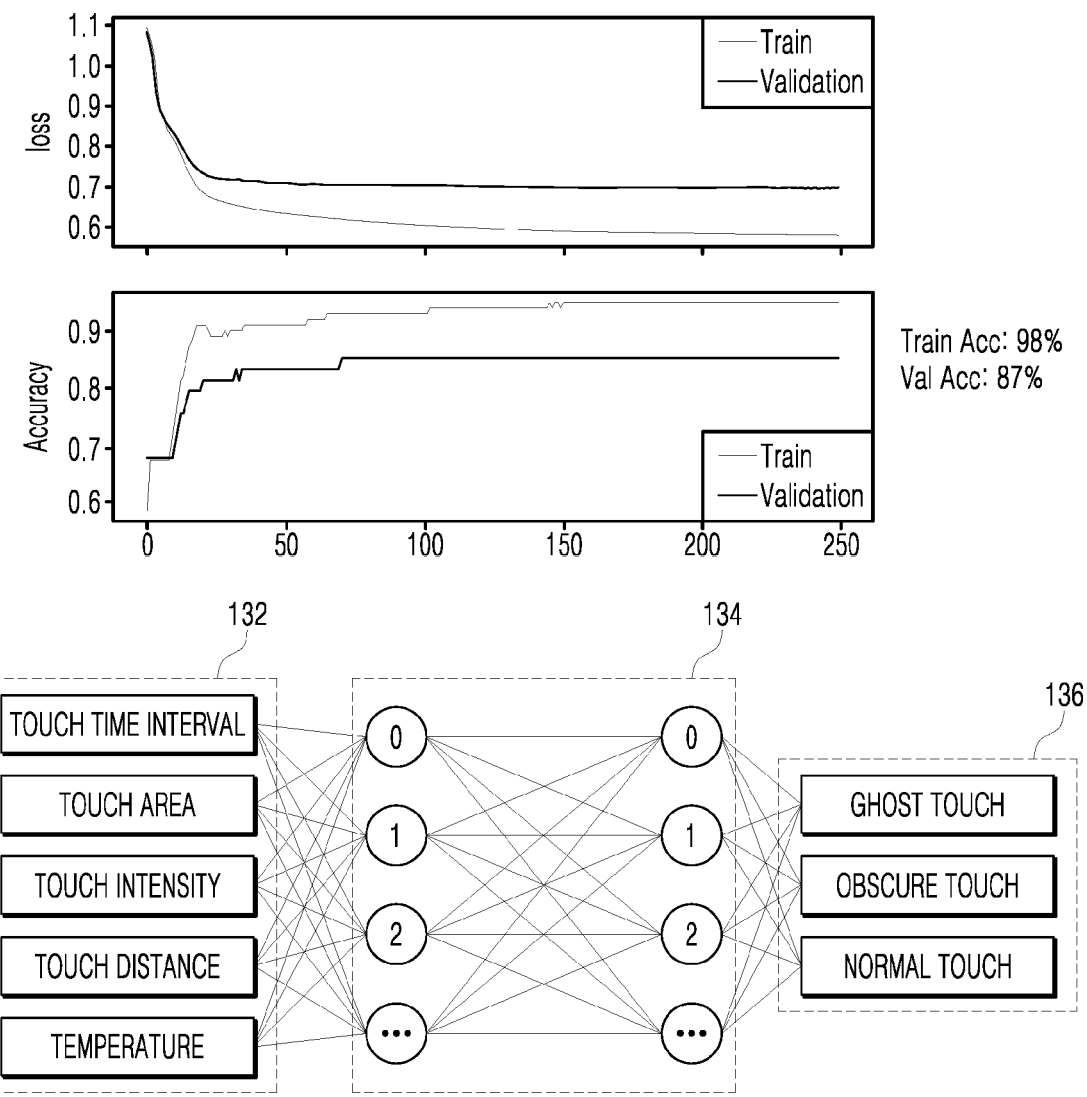
FIG. 5E is a graph of learning accuracy and loss function verified by a deep neural network structure for learning the learning data of FIG. 5A and the test data of FIG. 5B.

FIG. 5E is a graph of learning accuracy and loss function verified by the deep neural network structure for learning the learning data of FIG. 5A and the test data of FIG. 5B.

FIG. 5E shows a result of learning the learning data of FIG. 5A by the deep neural network of the normal/false touch classifying engine and verifying by the test data of FIG. 5B. FIG. 5E shows that the learning accuracy (Train Acc) is 0.98, and the verification accuracy (val acc) is 0.87 as a result of learning an artificial neural network composed of two input layers of a touch time interval and a touch area, three hidden layers [10, 20, 10], and three output layers of a normal touch, an obscure touch, and a ghost touch. In order to obtain the verification accuracy of 95% or more, the learning data of the detected touch input may be preprocessed before learned by the AI model in order to determine a false touch by using an F-score program, which is used to evaluate the importance of feature, etc.

Figure 6:
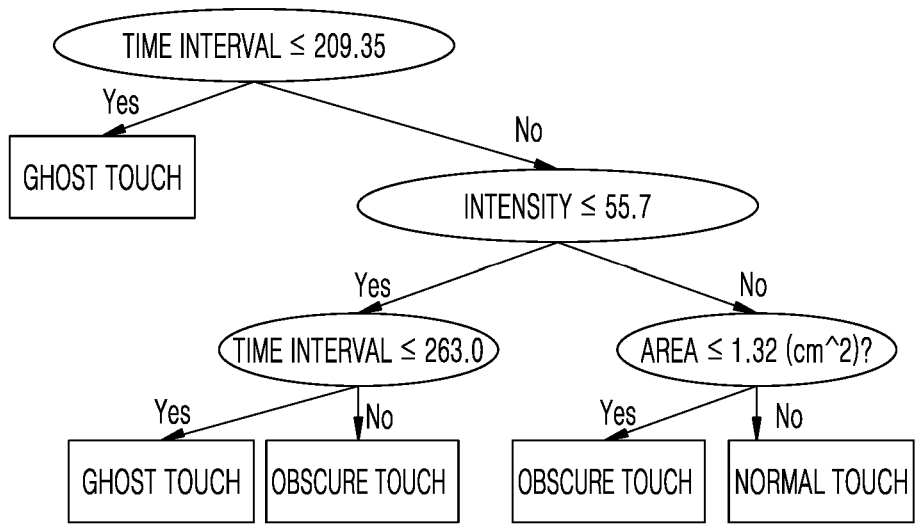
FIG. 6 is a diagram showing the decision tree created to determine the false touch of a pressure sensitive type touch screen according to an embodiment of the present disclosure.

FIG. 6 is a diagram showing a decision tree created for determining a false touch of a pressure sensitive type touch screen according to an embodiment of the present disclosure.

FIG. 6 shows a decision tree obtained by analyzing a decision tree structure similar to the CART algorithm of FIG. 5C by collecting learning data for them in order to learn the normal/false touch classifying engine by using the area, the time interval, and the touch intensity of the touch input of the pressure sensitive type touch screen, and the touch type of the touch input as learning data.

According to the decision tree of FIG. 6, when the time interval≤209.35 or 209.35<time interval≤263.0 and the intensity≤55.7, it is determined as a ghost touch, when 263.0<time interval, the intensity≤55.7, or 209.35<time interval, and 55.7<intensity and area≤1.32 (cm$^2$), it is determined as an obscure touch, and when 209.35<time interval, 55.7<intensity, and 1.32 (cm$^2$)<area, it is determined as a normal touch. According to such a machine learning algorithm, the touch type classifier 136 of the false touch determining device 10 may classify and determine the touch type. In the case of the AI model learned the touch type as two classification of a normal touch and a false touch, a normal touch and a false touch may be classified by regarding both the ghost touch and the obscure touch as a false touch in the decision tree of FIG. 6.

Figure 7A:
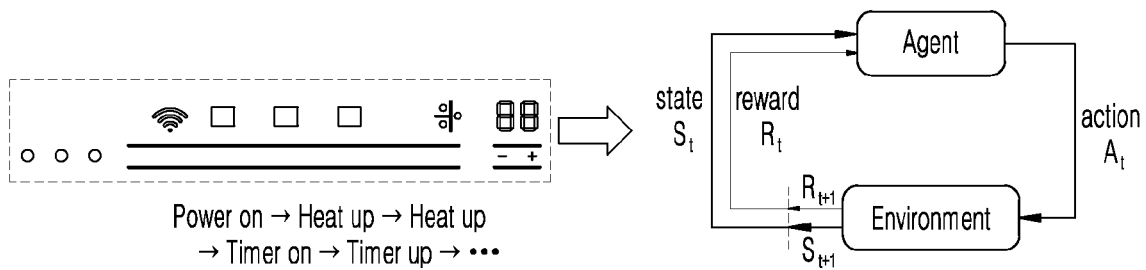
FIG. 7A is a conceptual diagram of a neural network model based on reinforcement learning according to an embodiment of the present disclosure.

FIG. 7A is a conceptual diagram of a reinforcement learning based neural network model according to an embodiment of the present disclosure.

As described in FIGS. 5A to 6, classification supervised learning for determining a false touch requires each type of labeled data related to the state of the touch input in order to learn the normal/false touch classifying engine.

In addition, the experimenter may directly touch and then confirm the input touch input location to manually label which kind of touch type (Ghost, Obscure, Normal) it has been touched for the learning data, or the input touch input location should be confirmed by installing the vision sensor such as a camera.

In the case of an obscure touch where two or more adjacent touches are simultaneously input, or a signal is weakly transferred by a foreign matter, etc., a separate learning is additionally required to accurately classify the touch intended by a user.

On the other hand, learning through reinforcement learning is to learn an action for maximizing a future value by itself based on its reward by the action in a state where the past result is insufficient. It does not require touch type labeling for the data, and does not require the labeling of the touch type for learning data.

It is impossible to program them by a false touch determining algorithm by predicting the occurrence condition of the ghost touch and the obscure touch in advance. Since the touch screen is affected by heat in an electric range and a burner, etc., and by water in a dishwasher and a refrigerator, it is not possible to program in an explicit rule base under which condition a ghost touch and an obscure touch occur. However, when the false touches of the ghost touch and the obscure touch are matched through continuous learning, the reinforcement learning for determining the false touch may be possible by giving a reward.

The reinforcement learning for determining the false touch may assume a specific sequence of the touch input inputted within a certain time (including no input assuming a ghost touch situation), set a reward by comparing an actual setting value of the touch input with a target setting value of the intended touch input targeted by the corresponding sequence, and learn by giving penalty in proportion to a difference between the target setting value and the actual setting value after touching.

The reinforcement learning based neural network model for determining the false touch according to an embodiment of the present disclosure is configured for an agent for determining the touch type of whether the touch input is a normal touch or a false touch to perform an action for deciding the touch type with respect to the state where at least two of a time interval of the touch input, a touch area of the touch input, a touch intensity of the touch input, or a temperature of the touch input has been given, and to receive a reward when the touch type determined by the agent is an intended touch type. In a touch type determining environment that obtains the given state and the action (input) of the agent to return the reward and the next state (output), it may be configured for an agent to perform an action and update the false touch determining performance in the given state so as to receive the maximum reward. The environment is the remainder except for the agent, and the environment obtains the current state and action (input) of the agent to return the reward and the next state (output).

The environment used in the practice of the reinforcement learning for determining the false touch may use the gym package environment of the OpenAI Gym. The OpenAI Gym is a library that helps the reinforcement learning and allows for reinforcement learning in more general situations. In addition, other libraries suitable for artificial neural network based reinforcement learning for determining the false touch such as TensorFlow may be used.

Figure 7B:
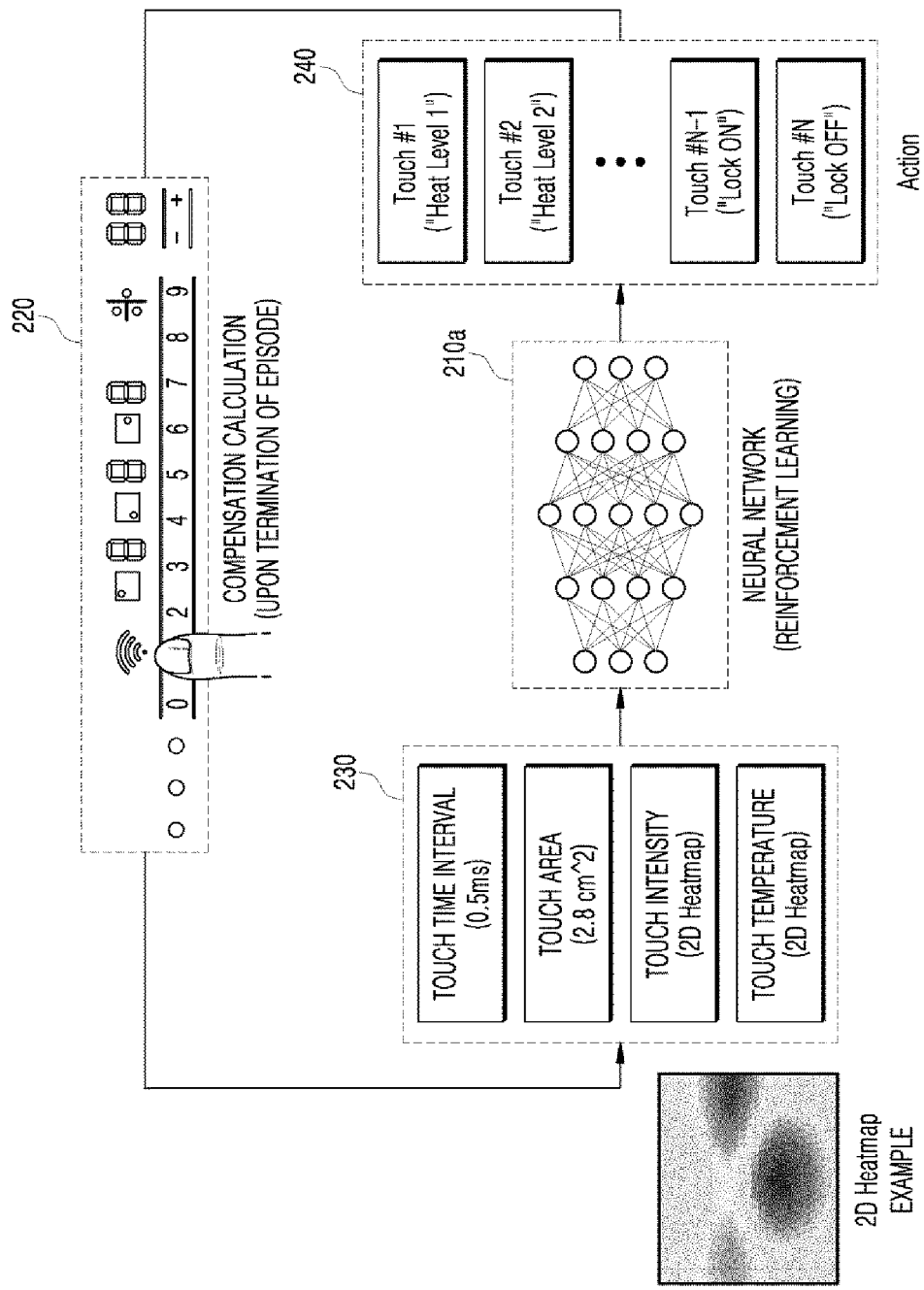
FIG. 7B is an exemplary diagram for learning the neural network model based on reinforcement learning according to an embodiment of the present disclosure.
Figure 8:
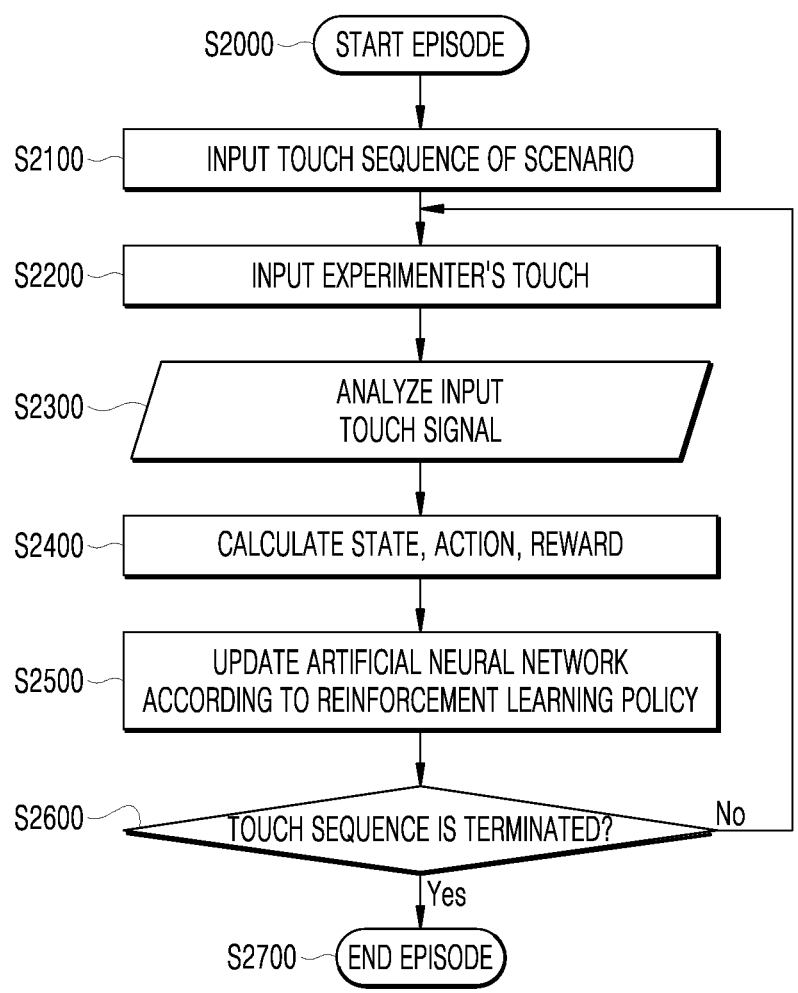
FIG. 8 is a flowchart for learning the neural network model based on reinforcement learning according to an embodiment of the present disclosure.

FIG. 7B is an exemplary diagram for learning reinforcement learning based neural network model according to an embodiment of the present disclosure.

The reinforcement learning based neural network model for determining the false touch may be learned in a simulator of the electronic apparatus equipped with the server 300 or a NPU chip. A false touch determining agent 210a of the reinforcement learning based neural network model decides a normal touch, a false touch (ghost touch or obscure touch) 240 in a state where at least two 230 among a touch time interval, a touch area, a touch intensity, or a touch temperature of the touch input from an electric range have been given, and gets the reward and a next state returned from the false touch determining environment 220.

A Human machine interface (HMI), such as an electric range, may be configured to be learned by a reward policy in which the reinforcement learning based neural network model for determining the false touch creates simulation scenarios to maximize a reward because there are many cases that are input as a touch sequence with continuous touches.

Table 1 shows the simulation scenarios for the false touch determining reinforcement learning and the action result of the false touch determining agent in each state according to each scenario, according to an embodiment of the present disclosure.

TABLE 1

| | Episode 1 | Episode 2 | Episode 3 |
|---|---|---|---|
| Device current setting value | First burner ON (temperature level 4, timer OFF), second and third burners OFF | First burner ON (temperature level 2, timer 10 minutes), second and third burners OFF | First burner ON (temperature level 2, timer 10 minutes), second and third burners OFF |
| Target value of touch input | First burner ON (temperature level 6, timer 20 minutes), second burner ON (temperature level 3, timer 10 minutes), third burner OFF | First burner ON (temperature level 2, timer 10 minutes), second burner ON, third burner OFF | First burner ON (temperature level 2, timer 10 minutes), second and third burners OFF |
| Sequence scenario of touch input | Scenario 1 (plural sequences): first burner selected (N) → temperature level 6 (N) → timer setting 20 minutes (N) → second burner selected (N) → temperature level 3 (N) → timer setting 10 minutes (N) | Scenario 2 (single sequence): second burner selected | Scenario 3 (no input, ghost touch environment): no input (creation of an environment in which a ghost touch may occur, for example, ghost data of FIG. 5A) |
| The number of State (Action) | Six [first burner selected (N, G, O) → temperature level 6 (N, G, O) → timer setting 20 minutes (N, G, O) → second burner selected (N, G, O) → temperature level 3 (N, G, O) → timer setting 10 minutes (N, G, O)] | One [second burner selected (N, G, O)] | One [no input (N, G, O)] |
| Agent action | First burner selected (N) → temperature level 6 (N) → time setting 20 minutes (N) → second burner selected (N) → temperature level 3 (N) → timer setting 10 minutes (N) | First burner selected (N) → temperature level 6 (N) → timer setting 20 minutes (N) → second burner selected (N) → temperature level 3 (O) → timer setting 10 minutes (N) | Second burner selected (N) | Second burner selected (O) or second burner selected (G) | No input (G) | No input (O) or no input (N) |
| Reward | Success (+1) | Penalty (−100) | Success (+1) | Penalty (−100) | Success (+1) | Penalty (−100) |

[N: normal touch, G: ghost touch, O: obscure touch]

In the Table 1, 'device current setting value' is a device setting value currently set in the device when simulating (practicing) the false touch determining reinforcement learning model. For example, the Episode 1 starts to simulate in a state where a first burner of the electric range is turned on at the temperature level 4 and the timer OFF, and second and third burners thereof are turned off.

In the Table 1, the 'target value of touch input' is a target value of the touch sequence in the electric range intended by a simulator. Here, the simulator may be a practitioner or a program programmed for practice. Accordingly, the simulator simulates and learns the false touch determining agent according to a touch input scenario 1 in order to change the state from the current setting value [first burner ON (temperature level 4, timer OFF), second and third burners OFF] to the target setting value [first burner ON (temperature level 6, timer 20 minutes), second burner ON (temperature level 3, timer 10 minutes), and third burner OFF] in the Episode 1. That is, the simulator will select the first burner to adjust the temperature from level 4 to level 6 and to adjust the timer to 20 minutes, select the second burner to adjust the temperature to level 3 and to adjust the timer to 10 minutes. At this time, the false touch determining agent may classify a normal touch, a ghost touch, or an obscure touch based on at least two of the touch time interval, the touch area, the touch intensity, the touch temperature, or the touch distance of the touch input (first burner selected touch input) for each state while passing through at least six states of the scenario 1. For example, when the time interval of the first burner selected touch input is 295.2 and the area thereof is 2.6 (data No. 23 in FIG. 5A), the false touch determining agent performs an action of selecting one touch type among a normal touch, a ghost touch, and an obscure touch. When the agent selects N, the target setting value and the touch setting value of the touch input coincide with each other, such that the agent will receive a reward (+1), and otherwise, when the agent selects G or O, the agent will receive a penalty (−100).

The selecting the action (normal touch, ghost touch, obscure touch) in the false touch determining reinforcement learning may use a random noise scheme or an E-Greedy scheme. The random noise scheme or the E-Greedy scheme may be regarded as implementing the exploit & exploration method. The random noise scheme gives random noise to a Q value according to the action possible in the current state, and selects the action having the maximum value as an action. The E-Greedy scheme gives a probability value e and performs exploration with the probability of e. For example, when e=0.99, a new path is found by performing the exploration with the probability of 99%, and performing the exploit with the probability of 1%.

In the Episode 1 of the Table 1, when the agent action has selected all of normal touches as in first burner selected (N)→temperature level 6 (N)→timer setting 20 minutes (N)→second burner selected (N)→temperature level 3 (N)→timer setting 10 minutes, the agent's action will receive a reward of (+1). If the agent's action has decided the touch type decision differently from the target setting value even in one state as in first burner (N)→Temperature level 6 (N)→timer setting 20 minutes (N)→second burner selected (N)→Temperature level 3 (O)→timer setting 10 minutes (N), the agent's action will receive a penalty of (−100). As described above, since the agent may perform three actions in each of the six states, the agent's action has 3*3*3*3*3*3=729 cases, and when only a case where all are N is selected, the agent will receive a reward of (+1) and when the remaining 728 cases are selected, the agent will receive a penalty of (−100).

The Episode 2 in the Table 1 is a scenario with a single sequence, and because there is one state, the agent may select one of three cases, and since only single sequence second burner selection is required in order to achieve the target value of the touch input [first burner ON (temperature level 2, timer 10 minutes), second burner ON, and third burner OFF] from the current setting value [first burner ON (temperature level 2, timer 10 minutes), and second and third burners OFF], the agent may select an action of selecting one of three touch types in one state. At this time, when N is selected in the case that the time interval of the touch input is 189.6 and the area thereof is 1.19 (data No. 29 in FIG. 5A), the agent will receive a reward of (+1), and when G or O is selected, the agent will receive a penalty of (−100).

The Episode 3 of the Table 1 is a case where the touch result value is displayed even in the sequence of no input. Here, the no input means no input by the practitioner's finger, and the input by water droplets or oil may also be regarded as no input. The Episode 3 may be a case that outputs the touch result value by being influenced by water droplet, oil, or a device having a magnetic force in a state where the device current setting value [first burner ON (temperature level 2, timer 10 minutes), and second and third burners OFF] is equal to the target setting value [first burner ON (temperature level 2, timer 10 minutes), and second and third burners OFF]. In this case, the agent may select an action of selecting one of three touch types in one state. At this time, when G is selected in the case where the time interval of the touch input is 150 and the area thereof is 0.89 (data No. 84 in FIG. 5A), the agent will receive a reward of (+1), and when N or O is selected, the agent will receive a penalty of (−100).

When the agent has done something in a current certain state, the expected reward that may be obtained in the future is called an action value function, or Q function, Q(s, a). The reinforcement learning for determining the false touch may be achieved by Q-learning, which is one of the reinforcement learning techniques for learning without model. The Q-learning may be used to find the optimal policy for a given finite Markov decision process. The Q-learning learns the optimal policy by learning the Q function, which is a function that predicts the expected value of utility caused by performing a given action in a given state.

The Q is a guide as to what action to take in a given state. In this problem, a two-dimensional array called the Q stores the reward that may be obtained by taking the action in the current state. When the argmax function is used in this Q two-dimensional array, what to take the action may be obtained. In this problem, the state is the number of cases where a touch may be made in the electronic apparatus. For example, in the Episode 1 of the Table 1, when one sequence with 6 touch inputs necessary for setting the first burner ON (temperature level 2, timer 10 minutes) in the electric range is configured, the state is 6. The action is 2 for normal/false touch and 3 for normal/ghost/obscure touch (N/G/O). In the Episode 2 of the Table 1, the state is one because it is a single sequence, and since the Episode 3 is also the case where the touch result value has been calculated in the no input having no sequence, the state is one.

Updating the Q in the Q-learning algorithm may use Q (state, action)=R+max (Q (new state)). The R refers to a value assigned inside the game as a reward. The Q value when taking a certain action in the current state is the sum of the reward obtained from the action and the maximum value of the reward that may be obtained from the state changed by the action. That is, the meaning is to add the current reward and the maximum value of the reward that may be obtained in the future.

However, at this time, a small penalty may be given to a future reward by multiplying the future possible reward by a discount factor less than 1 (for example, 0.99 in the practice) in Q (state, action)=R+discount*max (Q (new state)), and through this method, the Q may be learned in a more optimal method. At this time, the discount may find a good value by trying several times with a hyperparameter.

The conventional Q-learning technique may perform vigorous learning in the environment that move within a limited number of states. However, when the state space increases, there is a problem in storing the Q value. The Q value is a measured value of a value function for the state. For example, the location and distribution of each terminal may be changed indefinitely, and since there are a very large number of combinations, it is not efficient to store the Q value for each situation.

DQN solves this problem by estimating a function that decides a Q value, rather than storing an individual Q value. When the conventional Q-learning technique has stored the state in each table and has confirmed the Q value through a lookup, the DQN inputs the current state to a value network and extracts the Q value as a result value. The DQN may approximate a function of deciding the Q value by using a value network of three or more layers.

The first convolutional layer of the DQN receives as an input the two-dimensional distribution of at least two data of a time interval, an area, an intensity, and a temperature of the touch input. This layer finds low level features by using a convolution mask of 5*5. The low level feature means, for example, simple features between the time interval and area of any two touch inputs. The next two layers find high level features by using a convolution mask of 3*3. The high level feature may be a feature that may be inferred from the low level feature previously found, and means the spatial distribution of the time interval and area data.

In the last layer, 2*2 maximum pooling is performed. The maximum pooling is the task of leaving only one maximum value within an n*n mask, which may be seen as the task reducing the accuracy by reducing data. After this layer, all output values are input to a fully connected layer. The fully connected layer may have 1000, then 100, and 10 dimensions of the first layer. This is for leaving only important feature by gradually reducing the number of output values of neuron. Finally, the Q value may be obtained by collecting 10 output values in one neuron. In another embodiment of the present disclosure, the DQN may also use another structure of a value network.

FIG. 7C is a flow chart for learning the reinforcement learning based neural network model according to an embodiment of the present disclosure.

An Episode with the scenarios as in the Table 1 starts (operation S2000).

The false touch reinforcement learning based neural network model receives a touch sequence of a scenario as in the Table 1 (operation S2100), and receives at least two of the time interval, the touch area, the touch intensity, or the touch temperature of the touch input from an experimenter or a simulator (operation S2200).

The false touch determining environment analyzes the input touch signal (operation S2300), and the next state (at least two values among the time interval, the touch area, the touch intensity, or the touch temperature of the touch input) and the reward is returned to the false touch determining agent 230a from the current state (at least two values among the time interval, the touch area, the touch intensity, or the touch temperature of the touch input) and the action (one of N, G, O) received from the false touch determining agent 230a (operation 2400).

The reinforcement learning based neural network model evaluates whether the false touch determining performance has been improved according to the reinforcement learning policy and updates the artificial neural network model when the performance has been improved (operation S2500). In an embodiment of the present disclosure, the reward may be calculated when the sequence input of each scenario, which is one Episode, is terminated.

The operations S2200, S2300, S2400, S2500 are repeated until the touch sequence of the input scenario is terminated, and the Episode is terminated when the touch sequences of the input scenario are terminated (operation S2600).

The reinforcement learning based artificial neural network model may simulate a plurality of scenarios and may be mounted in the touch type classifier 136 of the false touch device. When the false touch reinforcement learning based neural network model is learned to secure constant performance in the electronic apparatus 200 equipped with the server 300 or the NPU chip, the touch type classifier may determine the false touch.

The embodiments of the present disclosure described above may be implemented through computer programs executable through various components on a computer, and such computer programs may be recorded in computer-readable media. For example, the recording media may include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly conditions otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Accordingly, it should be understood that the scope of the present disclosure is not limited to the example embodiments described above or by the use of such terms unless limited by the appended claims. Accordingly, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Accordingly, technical ideas of the present disclosure are not limited to the above-mentioned embodiments, and it is intended that not only the appended claims, but also all changes equivalent to claims, should be considered to fall within the scope of the present disclosure.

What is claimed is:

1. A method for determining a false touch on a touch screen of an electronic apparatus, comprising:
    detecting a touch input in order to obtain a touch result value through the touch screen;
    detecting at least two of a time interval with a previously input touch input of the detected touch input, a touch area of the touch input, a touch intensity of the touch input, or a temperature of the touch input;
    inputting, to a computer configured to execute a learned artificial (AI) model, data related to the detected at least two of the time interval, the touch area, the touch intensity, or the temperature to determine whether a touch type of the detected touch input is a normal touch or a false touch;
    applying the input data to the learned AI model; and
    outputting, by the learned AI model, whether the detected touch input is a normal touch or a false touch,
    wherein the normal touch is a touch that a target setting value of an intended touch input and the touch result value of the detected touch input coincide with each other, and the false touch is a touch that an unintended touch result value is detected even without touch input, or the target setting value and the touch result value of the detected touch input does not coincide with each other,
    wherein the learned AI model is a reinforcement learning based neural network model configured so that a false touch determining program for determining whether a touch type of the touch input is a normal touch or a false touch performs an action for deciding the touch type with respect to a state where at least two of a time interval of the touch input, a touch area of the touch input, a touch intensity of the touch input, or a temperature of the touch input have been given, and the false touch determining program receives a reward based on the decided touch type being an intended touch type, and
    wherein the reinforcement learning based neural network model is configured so that the false touch determining program performs an action in the state and updates a false touch determining performance in order to receive a maximum reward, in a false touch determining environment that receives the state and the action of the program to return the reward and a next state.

2. The method for determining the false touch on the touch screen of the electronic apparatus of claim 1,
wherein the learned AI model is learned to classify and output whether the detected touch input is a normal touch or a false touch by using at least two of the time interval, the touch area, the touch intensity, or the temperature, which have been detected, of a plurality of detected touch inputs, and touch types labeled to the plurality of touch inputs as learning data.

3. The method for determining the false touch on the touch screen of the electronic apparatus of claim 1,
wherein the false touch comprises a ghost touch and an obscure touch,
wherein the ghost touch is a false touch that detects an unintended touch result value even without touch input, and the obscure touch is a false touch that the target setting value and the touch result value of the detected touch input does not coincide with each other, and
wherein the learned AI model is learned to classify and output whether the detected touch input is a normal touch, a ghost touch, or an obscure touch by using at least two of the time interval of a plurality of detected touch inputs, the touch area of the touch input, the touch intensity of the touch input, or the temperature of the touch input, and touch types labeled to the plurality of touch inputs as learning data.

4. The method for determining the false touch on the touch screen of the electronic apparatus of claim 1, further comprising removing or calibrating a touch input based on the detected touch type being a false touch,
wherein the calibrating the false touch input comprises at least one of a noise reduction filter adding scheme, a touch sensitivity adjusting scheme, or a touch frequency changing scheme.

5. The method for determining the false touch on the touch screen of the electronic apparatus of claim 3, further comprising removing a touch input or calibrating the touch input based on the detected touch type being a false touch,
wherein the removing the touch input or calibrating the touch input based on the detected touch type being a false touch comprises removing the touch input based on the detected touch type being a ghost touch, and calibrating the touch input based on the detected touch type being an obscure touch.

6. The method for determining the false touch on the touch screen of the electronic apparatus of claim 5,
wherein the calibrating the obscure touch input comprises at least one of a noise reduction filter adding scheme, a touch sensitivity adjusting scheme, or a touch frequency changing scheme.

7. The method for determining the false touch on the touch screen of the electronic apparatus of claim 2,
wherein the learned AI model is learned by a classification analysis by using at least two of the time interval, the touch area, the touch intensity, or the temperature, which have been detected, of a plurality of detected touch inputs, and touch types labeled to the plurality of touch inputs as learning data.

8. The method for determining the false touch on the touch screen of the electronic apparatus of claim 1,
wherein the reinforcement learning based neural network model is configured to learn simulation scenarios having the target setting value of the intended touch input as a sequence, and learned to be updated by performing each simulation scenario, and
wherein the reward is calculated based on the sequence of each scenario being terminated.

9. The method for determining the false touch on the touch screen of the electronic apparatus of claim 8,
wherein the reinforcement learning based neural network model uses a reinforcement learning based neural network, which is a Deep Q-network (DQN).

10. A computer readable recording medium storing a program programmed to determine a false touch on a touch screen of an electronic apparatus, the program having computer-executable instructions for performing steps comprising:
detecting a touch input in order to obtain a touch result value through the touch screen;
detecting at least two of a time interval with a previously input touch input of the detected touch input, a touch area of the touch input, a touch intensity of the touch input, or a temperature of the touch input;
inputting, to a computer configured to execute a learned artificial intelligence (AI) model, data related to the detected at least two of the time interval, the touch area, the touch intensity, or the temperature to determine whether a touch type of the detected touch input is a normal touch or a false touch;
applying the input data to the learned AI model; and
outputting, by the learned AI model, whether the detected touch input is a normal touch or a false touch,
wherein the normal touch is a touch that a target setting value of an intended touch input and the touch result value of the detected touch input coincide with each other, and the false touch is a touch that an unintended touch result value is detected even without touch input, or the target setting value and the touch result value of the detected touch input does not coincide with each other,
wherein the learned AI model is a reinforcement learning based neural network model configured so that a false touch determining program for determining whether a touch type of the touch input is a normal touch or a false touch performs an action for deciding the touch type with respect to a state where at least two of a time interval of the touch input, a touch area of the touch input, a touch intensity of the touch input, or a temperature of the touch input have been given, and the program receives a reward based on the decided touch type being an intended touch type, and
wherein the reinforcement learning based neural network model is configured so that the false touch determining program performs an action in the state and updates a false touch determining performance in order to receive a maximum reward, in a false touch determining environment that receives the state and the action of the program to return the reward and a next state.

11. A false touch determining device for determining a false touch on a touch screen of an electronic apparatus, comprising:
a circuit configured to detect a touch input to obtain a touch result value through the touch screen, and detect at least two of a time interval of the detected touch input, a touch area of the touch input, a touch intensity of the touch input, or a temperature of the touch input;
a computer configured to execute a learned artificial intelligence (AI) model; and an output circuit configured to output whether the detected touch input is a normal touch or a false touch from the learned AI model by applying, to the learned AI model, data related to at least two of the time interval of the detected touch input, the touch area of the touch input, the touch intensity of the touch input, or the temperature of the touch input to determine whether a touch type of the detected touch input is a normal touch or a false touch, wherein the learned AI model is a reinforcement learning based neural network model configured so that a program for determining whether a touch type of the touch input is a normal touch or a false touch performs an action for deciding the touch type with respect to a state where at least two of a time interval of the touch input, a touch area of the touch input, a touch intensity of the touch input, or a temperature of the touch input have been given, and the program receives a reward based on the decided touch type being an intended touch type, and wherein the reinforcement learning based neural network model is configured so that the program performs an action in the state and updates a false touch determining performance in order to receive a maximum reward, in an environment that obtains the state and the action of the program to return the reward and a next state.

12. The false touch determining device for determining the false touch on the touch screen of the electronic apparatus of claim 11, wherein the learned AI model is learned to infer and output whether the detected touch input is a normal touch or a false touch by using at least two of the time interval of a plurality of detected touch inputs, the touch area of the touch input, the touch intensity of the touch input, or the temperature of the touch input, and touch types labeled to the plurality of touch inputs as learning data.

13. The false touch determining device for determining the false touch on the touch screen of the electronic apparatus of claim 11, wherein the false touch comprises a ghost touch and an obscure touch, wherein the ghost touch is a false touch that detects an unintended touch result value even without touch input, and the obscure touch is a false touch that detects an erroneous result value with respect to the touch input, and wherein the learned AI model is learned to classify and output whether the detected touch input is a normal touch, a ghost touch, or an obscure touch by using at least two of the time interval of a plurality of detected touch inputs, the touch area of the touch input, the touch intensity of the touch input, or the temperature of the touch input, and touch types labeled to the plurality of touch inputs as learning data.

14. The false touch determining device for determining the false touch on the touch screen of the electronic apparatus of claim 11, further comprising a false touch processor for removing or calibrating a false touch based on the detected touch type being a false touch, wherein the calibrating the false touch input comprises at least one of a noise reduction filter adding scheme, a touch sensitivity adjusting scheme, or a touch frequency changing scheme.

15. The false touch determining device for determining the false touch on the touch screen of the electronic apparatus of claim 13, further comprising a false touch processor for removing or calibrating a false touch based on the detected touch type being a false touch, wherein the false touch processor removes a touch input based on the detected touch type being a ghost touch, and calibrates the touch input based on the detected touch type being an obscure touch, and wherein the calibrating the obscure touch comprises at least one of a noise reduction filter adding scheme, a touch sensitivity adjusting scheme, or a touch frequency changing scheme.

16. The false touch determining device for determining the false touch on the touch screen of the electronic apparatus of claim 11, wherein the reinforcement learning based neural network model is configured to learn simulation scenarios for reinforcement learning having the setting value of the intended target touch as a sequence, and learned to be updated by using each simulation scenario as one episode, and wherein the reward is calculated based on the sequence input of each scenario, which is one episode, being terminated.

17. The false touch determining device for determining the false touch on the touch screen of the electronic apparatus of claim 16, wherein the reinforcement learning based neural network model uses a reinforcement learning based neural network, which is a Deep Q-network.

18. A touch screen system comprising a false touch determining device for determining a false touch on a touch screen of an electronic apparatus and a server, the touch screen system comprising:

a circuit configured to detect a touch input to obtain a touch result value through the touch screen, and detect at least two of a time interval of the detected touch input, a touch area of the touch input, a touch intensity of the touch input, or a temperature of the touch input;

a computer configured to execute a learned artificial intelligence (AI) model;

an output circuit configured to output whether the detected touch input is a normal touch or a false touch from the learned AI model by applying, to the learned AI model, data related to at least two of the time interval of the detected touch input, the touch area of the touch input, the touch intensity of the touch input, or the temperature of the touch input to determine whether a touch type of the detected touch input is a normal touch or a false touch; and a transceiver configured to communicate with the server, the transceiver configured to transmit, to the server, the detected at least two of the time interval of a plurality of the touch inputs, the touch area of the touch input, the touch intensity of the touch input, or the temperature of the touch input, and touch types labeled to the touch input, wherein the server is configured to execute the AI model learner for generating the learned AI model that has learned at least two of the plurality of the touch inputs, the touch area of the touch input, the touch intensity of the touch input, or the temperature of the touch input, which have been received, and the touch types labeled to the touch input through a deep neural network, wherein the server is configured to transmit, to the false touch determining device, the learned AI model that has learned through the AI model learner, and wherein the output circuit of the false touch determining device is configured to infer whether a touch type of the detected touch input is a normal touch or a false touch through the learned AI model received from the server, wherein the learned AI model is a reinforcement learning based neural network model configured so that a program for determining whether a touch type of the touch input is a normal touch or a false touch performs an action for deciding the touch type with respect to a state where at least two of a time interval of the touch input, a touch area of the touch input, a touch intensity of the touch input, or a temperature of the touch input have been given, and the program receives a reward based on the decided touch type being an intended touch type, and wherein the reinforcement learning based neural network model is configured so that the program performs an action in the state and updates a false touch determining performance in order to receive a maximum reward, in an environment that obtains the state and the action of the program to return the reward and a next state.

19. The touch screen system of claim 18, wherein the reinforcement learning based neural network model is configured to learn simulation scenarios having a target setting value of an intended touch input as a sequence, and learned to be updated by performing each simulation scenario, and wherein the reward is calculated based on the sequence of each scenario being terminated.

20. The touch screen system of claim 19, wherein the reinforcement learning based neural network model uses a reinforcement learning based neural network, which is a Deep Q-network (DQN).

* * * * *